United States Patent
Ramanujan et al.

(10) Patent No.: US 10,999,262 B1
(45) Date of Patent: May 4, 2021

(54) HIGH ASSURANCE TACTICAL CROSS-DOMAIN HUB

(71) Applicant: Architecture Technology Corporation, Minneapolis, MN (US)

(72) Inventors: Ranga Ramanujan, Medina, MN (US); Benjamin L. Burnett, Prior Lake, MN (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 464 days.

(21) Appl. No.: 15/959,709

(22) Filed: Apr. 23, 2018

Related U.S. Application Data

(60) Provisional application No. 62/489,320, filed on Apr. 24, 2017.

(51) Int. Cl.
*H04L 29/06* (2006.01)

(52) U.S. Cl.
CPC ...... *H04L 63/0485* (2013.01); *H04L 63/0245* (2013.01); *H04L 63/1416* (2013.01); *H04L 63/164* (2013.01); *H04L 2212/00* (2013.01)

(58) Field of Classification Search
CPC .............. H04L 63/0485; H04L 63/164; H04L 63/1416; H04L 63/0245; H04L 2212/00
See application file for complete search history.

(56) References Cited

U.S. PATENT DOCUMENTS

| | | | |
|---|---|---|---|
| 7,669,235 B2 | 2/2010 | Hunt et al. | |
| 8,561,142 B1 | 10/2013 | Sobel | |
| 8,970,348 B1 | 3/2015 | Evans et al. | |
| 9,419,799 B1 | 8/2016 | Chung | |
| 9,524,399 B1 * | 12/2016 | Takahashi | ............... G06F 21/78 |
| 9,858,441 B2 | 1/2018 | Brown et al. | |
| 10,091,230 B1 | 10/2018 | Machani et al. | |
| 10,164,974 B2 | 12/2018 | Spencer et al. | |
| 2002/0069369 A1 * | 6/2002 | Tremain | ............. H04L 63/0272 726/14 |
| 2004/0003284 A1 * | 1/2004 | Campbell | ............. H04L 63/145 726/24 |
| 2004/0044902 A1 * | 3/2004 | Luthi | .................. G06F 21/6218 726/15 |
| 2005/0198412 A1 * | 9/2005 | Pedersen | ............. G06F 21/6209 710/30 |

(Continued)

OTHER PUBLICATIONS

"A Heart to my Key," economist.com., economist.com, May 9, 2013, 4 pp.

(Continued)

*Primary Examiner* — Michael R Vaughan
(74) *Attorney, Agent, or Firm* — Shumaker & Sieffert, P.A.

(57) ABSTRACT

In general, the techniques of this disclosure describe a hub device that is configured to receive data packets from both secured client devices and non-secured client devices. The hub device may send the data packets from the secured client devices to a host device. For the data packets from the non-secured client devices, the hub device may first process the data packets to ensure the integrity of the received non-secure data packets and then send the non-secure data packets to the host device once the hub device determines that the non-secure data packets meet some threshold level of integrity.

29 Claims, 10 Drawing Sheets

(56) References Cited

U.S. PATENT DOCUMENTS

| | | | |
|---|---|---|---|
| 2007/0192585 A1* | 8/2007 | Briancon | H04L 63/0861 713/152 |
| 2008/0289027 A1* | 11/2008 | Yariv | H04L 63/0227 726/11 |
| 2009/0064309 A1* | 3/2009 | Boodaei | H04L 63/168 726/12 |
| 2009/0077375 A1* | 3/2009 | Anspach | H04L 63/0428 713/160 |
| 2014/0119727 A1* | 5/2014 | Ousley | H04L 63/105 398/45 |
| 2014/0157381 A1 | 6/2014 | Disraeli | |
| 2014/0304773 A1 | 10/2014 | Woods et al. | |
| 2015/0161370 A1 | 6/2015 | North et al. | |
| 2015/0281225 A1 | 10/2015 | Schoen et al. | |
| 2015/0363582 A1 | 12/2015 | Sheller et al. | |
| 2016/0233946 A1 | 8/2016 | Wengrovitz et al. | |
| 2016/0241523 A1 | 8/2016 | Ahn et al. | |
| 2017/0193211 A1 | 7/2017 | Blake et al. | |
| 2017/0242995 A1 | 8/2017 | Bassenye-Mukasa et al. | |
| 2018/0041475 A1* | 2/2018 | Rai | H04L 63/0263 |
| 2018/0054312 A1 | 2/2018 | Kamal | |
| 2018/0095900 A1 | 4/2018 | Sarangdhar et al. | |

OTHER PUBLICATIONS

"Joint Tactical Radio System," Wikipedia, retrieved from https://en.wikipedia.org/wiki/Joint_Tactical_Radio_System, Jan. 18, 2018, 9 pp.

"Multi-Factor Authentication," Wikipedia, retrieved from https://en.wikipedia.org/wiki/Multi-factor_authentication, on Jan. 18, 2018, 8 pp.

"NYMI Band: Product Overview," NYMI, retrieved from https://nymi.com/product_overview, on Jan. 18, 2018, 2 pp.

"Technavio Says Global EEG and ECG Biometrics Market Will Reach $42.14 Million by 2020," Techanvio.com, Apr. 7, 2016, 2 pp.

Keller, "ATCorp to build SWaP-Optimized Airborne Networking Router Prototypes for Carrier-Based Aircraft," Military and Aerospace Electronics, Jan. 19, 2017, 4 pp.

Lugovaya, "Biometric Human Identification Based on ECG," physionet.org, 2005 (Applicant points out, in accordance with MPEP 609.04(a), that the year of publication, 2005, is sufficiently earlier than the effective U.S. filing date, 2018, so that the particular month of publication is not in issue.) 9 pp.

"Using Phase III," Equipping the Warfighter with Small Business Ingenuity, Phase III Desk Reference, vol. 1.0, 2016 (Applicant points out, in accordance with MPEP 609.04(a), that the year of publication, 2016, is sufficiently earlier than the effective U.S. filing date, 2017, so that the particular month of publication is not in issue.) p. 16.

"Military Communications Market Worth USD 40.82 Billion by 2020," MarketWatch, Sep. 11, 2015, 2 pp.

"Military Tablet Wars: Windows Gaining on Apple," Kiosk Industry, Feb. 27, 2016, 1 pp.

"Harris Still in Neutral Zone," Zacks Equity Research, Feb. 13, 2012, 2 pp.

De Renesse, "Virtual Digital Assistants to Overtake World Population by 2021," informa.com, May 17, 2017, 3 pp.

"Gartner Says Worldwide Information Security Spending will Grow 7 Percent to Reach $86.4 Billion in 2017," gartner.com, Aug. 16, 2017, 4 pp.

U.S. Appl. No. 15/866,046, filed Jan. 9, 2018, by Charan et al.
U.S. Appl. No. 15/866,097, filed Jan. 9, 2018, by Bonney et al.
U.S. Appl. No. 15/870,492, filed Jan. 12, 2018, by Burnett et al.

* cited by examiner

HIGH ASSURANCE TACTICAL CROSS-DOMAIN HUB

This application claims the benefit of U.S. Provisional Application No. 62/489,320, filed Apr. 24, 2017, the entire content of which is incorporated herein by reference.

STATEMENT REGARDING FEDERALLY SPONSORED RESEARCH OR DEVELOPMENT

This invention was made with Government support under Contract W91CRB-17-C-0026 awarded by the United States Army. The Government may have certain rights in this invention.

TECHNICAL FIELD

The disclosure relates to handling and processing secured data.

BACKGROUND

Field-users of secure mobile devices may employ multiple digital assets in the field for digital communications and other applications. Examples may include voice applications and surveillance unmanned aerial vehicles (UAVs). Some data sources do not support any secured level classification. Some integrated systems may allow field-users to use commercial off-the-shelf (COTS) devices for secured level tactical and front-line use (e.g., common operating picture, data feeds, real-time communications, etc.). Even though the non-secured data sources may improve the effectiveness of field-users and improve the ability to complete missions, these systems may not be capable of connecting with secured devices because of the difference in security classification levels (i.e., rules governing the operation of secure devices preclude direct connection of such devices to non-secure devices or devices at a different classification level than the secured device; thus, the system may block the non-secured data from flowing into the secured domain and may control any/all data flowing into the non-secured domain).

SUMMARY

In general, the techniques of this disclosure describe a hub device that is configured to receive data packets from both secured client devices and non-secured client devices. The hub device may send the data packets from the secured client devices to a host device. For the data packets from the non-secured client devices, the hub device may first process the data packets to ensure the integrity of the received non-secure data packets and then send the non-secure data packets to the host device once the hub device determines that the non-secure data packets meet some threshold level of integrity.

In one example, the disclosure is directed to a method including receiving, by a hub device via a first port, a first data packet from a first client device, wherein the first client device has a first security classification. The method also includes performing, by the hub device, a first guard process on the first data packet based at least in part on the first security classification and, based on results of the first guard process indicating that the first data packet is valid, sending, by the hub device and via a third port, the first data packet to a host device. The method further includes receiving, by the hub device via a second port, a second data packet from a second client device, wherein the second client device has a second security classification different than the first security classification. The method also includes performing, by the hub device, a second guard process on the second data packet based at least in part on the second security classification, wherein the second guard process is different than the first guard process and, based on results of the second guard process indicating that the second data packet is valid, sending, by the hub device via the third port, the second data packet to the host device.

In another example, the disclosure is directed to a hub device that includes a first port, a second port, a third port, and one or more processors. The one or more processors are configured to receive, via the first port, a first data packet from a first client device, wherein the first client device has a first security classification. The one or more processors are further configured to perform a first guard process on the first data packet based at least in part on the first security classification and, based on results of the first guard process indicating that the first data packet is valid, send, via a third port, the first data packet to a host device. The one or more processors are further configured to receive, via the second port, a second data packet from a second client device, wherein the second client device has a second security classification different than the first security classification. The one or more processors are also configured to perform a second guard process on the second data packet based at least in part on the second security classification, wherein the second guard process is different than the first guard process and, based on results of the second guard process indicating that the second data packet is valid, send, via the third port, the second data packet to the host device.

In another example, the disclosure is directed to a computer readable storage medium storing instructions that when executed by one or more processors cause the one or more processors to receive, via a first port, a first data packet from a first client device, wherein the first client device has a first security classification. The instructions further cause the one or more processors are to perform a first guard process on the first data packet based at least in part on the first security classification and, based on results of the first guard process indicating that the first data packet is valid, send, via a third port, the first data packet to a host device. The instructions further cause the one or more processors to receive, via a second port, a second data packet from a second client device, wherein the second client device has a second security classification different than the first security classification. The instructions further cause the one or more processors to perform a second guard process on the second data packet based at least in part on the second security classification, wherein the second guard process is different than the first guard process and, based on results of the second guard process indicating that the second data packet is valid, send, via the third port, the second data packet to the host device.

In another example, the disclosure is directed to an apparatus that includes means for receiving, via a first port, a first data packet from a first client device, wherein the first client device has a first security classification. The apparatus also includes means for performing a first guard process on the first data packet based at least in part on the first security classification and, based on results of the first guard process indicating that the first data packet is valid, means for sending, via a third port, the first data packet to a host device. The apparatus further includes means for receiving, via a second port, a second data packet from a second client device, wherein the second client device has a second security classification different than the first security classification. The apparatus also includes means for performing a second guard process on the second data packet based at least in part on the second security classification, wherein the second guard process is different than the first guard process and, based on results of the second guard process indicating that the second data packet is valid, means for sending, via the third port, the second data packet to the host device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
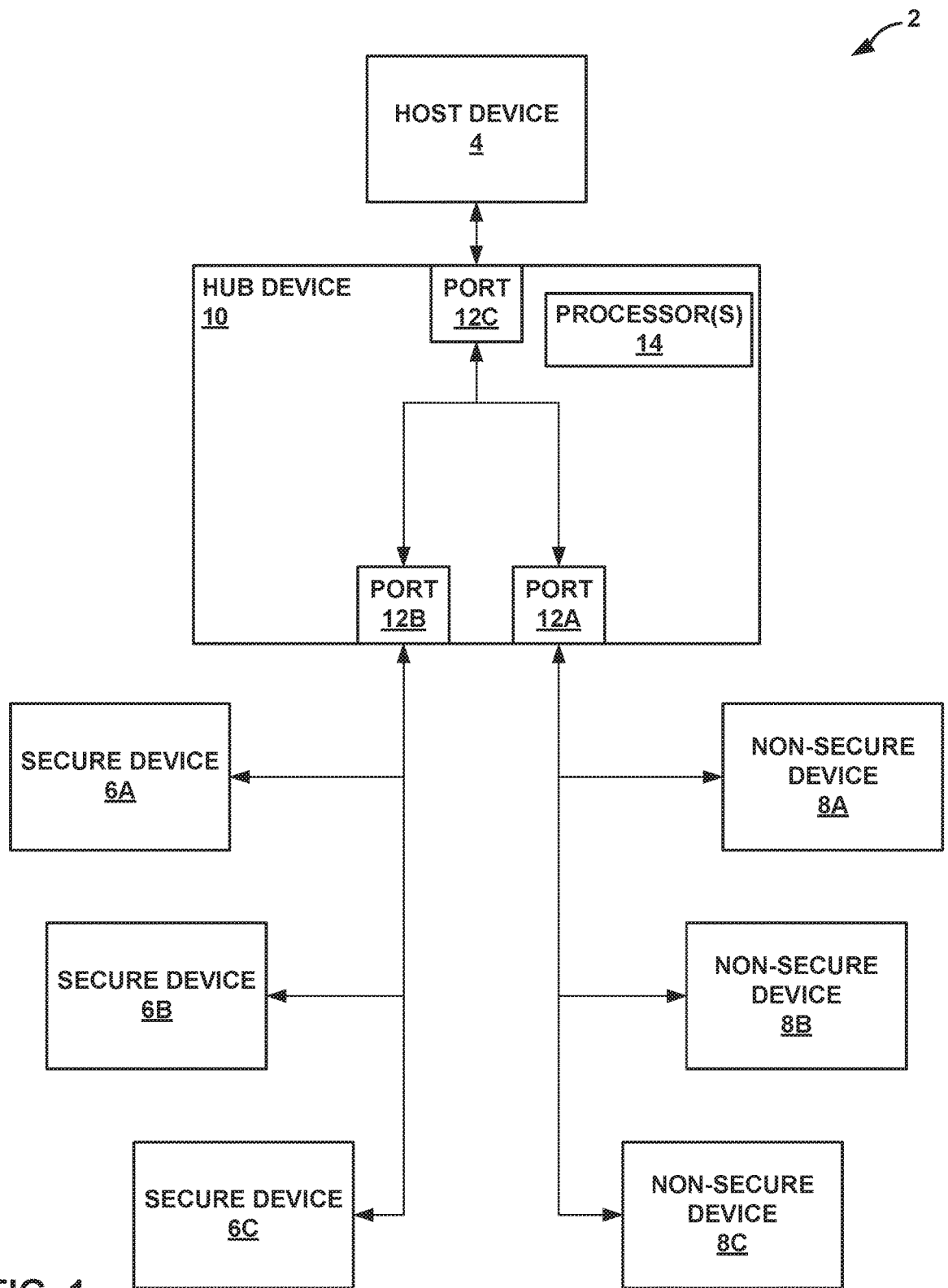
FIG. 1 is a block diagram illustrating an example of a hub device configured to receive data packets from both secure client devices and non-secure client devices and to forward the received data packets to a host device and for the host device to communicate back with the original sender, in accordance with one or more techniques of this disclosure.

In general, this disclosure describes a hub device that is configured to receive data packets from both secured client devices and non-secured client devices. In some instances, the hub device may send the data packets from the secured client devices straight to a secured host device, as secured client devices may be implicitly trusted within the overall system of devices in the information exchange. In other instances, the hub device may perform some preliminary processing of the secure data packets, such as determining a sender of the data packets or the type of contents within the data packets. For the data packets originating from the non-secured client devices, the hub device may first process the data packets to ensure the integrity of the received non-secure data packets. Generally, the hub device may process and route non-secure traffic according to some pre-defined guard process based on the particular non-secure source. For instance, the hub device may perform a virus scan and/or some other integrity check on the non-secure data packets prior to sending the non-secure data packets to the host device such that the hub device blocks unsafe data packets or infiltration attempts from outside devices being forwarded to the host device.

Other devices may simply block all non-secured data from reaching the host device entirely. However, the non-secured data may still include critical information necessary for the host device. As such, blocking the data entirely may be detrimental. Other devices, however, may analyze the non-secured data once it reaches the host device. However, due to the potential damaging nature of non-secured data, malicious or virus-laden data may damage the host device to the point of where the host device may be useless or compromised.

Rather than blocking non-secured data either entirely or not at all, the techniques described herein may provide heightened one-way filtering of incoming data packets/streams received from non-secured client devices (e.g., transmission control protocol (TCP) data flows and user datagram protocol (UDP) data flows). Further, a single hub device may interconnect multiple data sources, both secured and non-secured, across multiple ports to the secured host device. A single hub device also implies a single configuration interface. The hub device, for example, may be a computing device with a full central processing unit (CPU), one or more universal serial bus (USB) ports (e.g., 4), one or more Ethernet ports (e.g., 2), and an operating system or a micro-operating system (e.g., the evaluation assurance level (EAL) 7 secure level 4 (seL4) micro-kernel), although other examples of the hub device may include more or fewer ports, different protocols for the ports (e.g., Wi-Fi, Bluetooth, etc.), or a different CPU and/or operating system. The hub device of this disclosure may perform the techniques described herein regardless of the device type, vendor, or operating system used by the end-user host device.

The hub device of this disclosure may be configured to provide a cross-domain solution (CDS) between the secure and non-secure domains that takes advantage of a modular virtualized framework. A Virtualized CDS Software Framework (VCSF) may utilize an approved hypervisor solution and approved virtual machine components that can be installed on different hardware and then customized for different needs. Specific data flow filters can then be selected and installed to create a customized CDS product.

Furthermore, by using a modular virtualized framework, the techniques described herein enable the VCSF to be implemented on a small hub device that may be worn by the end-users, such as on a device that may be clipped onto an article of clothing or carried as a backpack. These hub devices may also be mounted onto a vehicle or incorporated to a larger server device.

FIG. 1 is a block diagram illustrating an example system 2 that includes hub device 10 configured to receive data packets from both secure client devices 6A-6C and non-secure client devices 8A, 8B, and 8C and to forward the received data packets to a host device 4, in accordance with one or more techniques of this disclosure. System 2 is shown to include host device 4, secure client devices 6A-6C (collectively, secure client devices 6), non-secure client devices 8A, 8B, and 8C (collectively, non-secure client devices 8), and hub 10. This specific arrangement of devices, however, is only a single example configuration of system 2. In other configurations, there may be more secure/non-secure client devices or less (as few as zero) secure/non-secure client devices operably connected to hub 10 than shown in FIG. 1. Further, the various client devices may communicate with one another through hub 10. For instance, secure client device 6A may send data packets to non-secure client device 8B via hub 10, non-secure client device 8B may send data packets to secure client device 6C via hub 10, host device 4 may send data packets to any of secure client devices 6A-6C or non-secure client devices 8A-8C via hub 10, or any other combination of connected devices. For any of the data packets or data flows passing through hub 10, regardless of the sender device and the intended destination device, hub 10 may perform a guard process, in accordance with the techniques described herein, on the data flowing through hub 10.

Host device 4 is an end-user device (EUD) described below, for purposes of illustration only, as a tablet computer. However, in some examples, host device 4 may be a computerized watch (e.g., a smart watch), computerized eyewear, computerized headwear, other types of wearable computing devices, a smartphone, a personal digital assistant (PDA), a laptop computer, a media player, a television platform, an automobile navigation system, a digital camera, or any other type of mobile and/or non-mobile computing device that is configured to perform a media operation as described herein.

Secure client devices 6 may be any device configured to send data packets to hub 10 over a secured channel (e.g., a hard-wired connection or a closed/protected network connection) and further configured to operate in accordance with a trusted secure security classification, such as secret, top secret, classified, or protected. Examples of secure client devices 6 may include a secured radio device, a secured global positioning system device, any computing device configured to operate in accordance with an encryption protocol also used by host device 4, a computing device configured to utilize steganography to write a particular string of data within a data packet, any computing device that has been approved for secure status (e.g., an approved surveillance drone, an approved UAV, an approved video feed, an approved biometric sensor, etc.), or any other computing device configured to operate with some threshold level of security such that host device 4 may implicitly trust the data packets received from secure client devices 6.

Non-secure client devices 8 may be any device configured to send data packets to hub 10 over a non-secured channel (e.g., an open network or an unprotected network) or a channel with unknown security. Further, non-secure client device 8 may not be configured to operate in accordance with a trusted secure security classification or it may be unknown to hub 10 and host device 4 as to whether non-secure client devices 8 are configured to operate in accordance with a trusted secure security classification. Examples of non-secure client devices 8 may include a UAV, a general data producing device not configured to operate in accordance with a trusted security protocol, video and voice applications, anonymous cellular phones, landline telephones, anonymous Internet devices, any computing device that has not been approved for secure status (e.g., a non-approved surveillance drone, a non-approved video feed, a non-approved biometric sensor, etc.), biometric sensors, or any other untrusted or potentially unsafe computing device.

For the purposes of this disclosure, hub 10 may be any device capable of receiving data from and sending data to at least two computing devices (i.e., host device 4 and at least one of secure client devices 6 or non-secure client devices 8). Hub 10 may be configured to utilize one or more different communication protocols for receiving and sending the data packets, including Wi-Fi (e.g., the Institute of Electrical and Electronics Engineers (IEEE) 802.11 standard), the Bluetooth protocol, various radio frequency communication devices and waveforms, USB, the Ethernet industrial protocol, radio waves/frequencies, the Internet protocol suite, Java remote method invocation, dynamic data exchange, or any other communication protocol suitable for exchanging secure and non-secure data packets.

Hub 10 may include three or more ports 12A, 12B, and 12C (collectively, ports 12). Ports 12 may serve as an interface between hub 10 and other computers or peripheral devices (e.g., host 4, secure client devices 6, and non-secure client devices 8). In some examples, ports 12 may refer to a physical connection, and in other examples, ports 12 may refer to logical or wireless connections. Electronically, when ports 12 refer to a physical connection, several conductors where ports 12 and a physical cable contacts connect may provide a method to transfer signals between devices. In other examples, ports 12 may refer to a portion of hub 10 configured to wirelessly connect with other computing devices in order to exchange information and data packets/streams. In some examples, each port of ports 12 may be configured to only communicate with devices in a particular domain. For instance, port 12A may only communicate with client devices in the non-secure domain and over a non-secure network connection, and port 12B may only communicate with client devices in the secure domain and over a secure network connection.

Hub 10 may further include one or more processors 14. One or more processors 14, in one example, are configured to implement functionality and/or process instructions for execution within hub 10. For example, processors 14 may be capable of processing instructions stored in a storage device of hub 10. Examples of processors 14 may include, any one or more of a microprocessor, a controller, a digital signal processor (DSP), an application specific integrated circuit (ASIC), a field-programmable gate array (FPGA), or equivalent discrete or integrated logic circuitry.

In accordance with the techniques of this disclosure, processors 14 of hub 10 may receive, via port 12A, a first data packet from non-secure client device 8A. For instance, non-secure client device 8A may be a data producing device not configured to operate in accordance with a trusted or secure protocol. For instance, a secure protocol may include the IPsec protocol or the encapsulating security payload (ESP) protocol, among other things. Conversely, the non-secure data producing protocols may include the real-time protocol (RTP) for voice or audio, the voice over internet protocol (VoIP), or the file transfer protocol (FTP), among other things. However, non-secure client device 8A may generate information that would be beneficial to transmit to host 4. As such, non-secure client device 8A may transmit the data packets to hub 10 via port 12A.

Processors 14 of hub 10 may also receive, via port 12B, a second data packet from secure client device 6A. For instance, secure client device 6A may be a radio that transmits data packets wirelessly to hub 10 over a channel that uses a trusted or secure protocol. Host 4 may request a status update from a user of secure client device 6A, and secure client device 6A may respond by transmitting the data packets to hub 10 via port 12B.

In some examples, based on the sender of the respective data packet, processor 14 may perform separate guard processes on the respective data packets. For instance, processors 14 may perform a first guard process on the first data packet based on the security classification of non-secure client device 8A (i.e., non-secure or untrusted) and perform a second guard process on the second data packet based on the security classification of secure client device 6A (e.g., a secure security classification, such as secret, top secret, classified, or protected). For the second guard process, in some instances, processors 14 may simply forward the second data packet to host 4 via port 12C. In other instances, for the second guard process, processors 14 may analyze contents of the second data packet to determine an identity of the sender of the second data packet or the type of contents in the second data packet prior to forwarding the second data packet to host 4 via port 12C. As the second data packet may come from a secure and trusted client device, processors 14 may refrain from determining an integrity of the received data and performing a virus scan operation on the second data packet, or only determine that the sender of the second data packet is a verified secure client device. As described in greater detail below with respect to FIG. 2, the first guard process may include performing an integrity check and/or a virus scan, or, generally, a heightened filtering process.

Processors 14 of hub 10 may send, via port 12C, the first data packet from non-secure client device 8A and the second data packet from secure client device 6A to host 4. Port 12C may forward the respective data packets to host 4 either upon receipt of the respective data packets or after the respective data packets have been processed. In other words, port 12C may not necessarily forward the first data packet and the second data packet simultaneously, but instead forward the first data packet and the second data packet after processors 14 determines the respective data packet to be safe to forward to host 4 in the respective data packet's own respective processing loop. The timing with which processors 14 forward the first data packet is independent of the timing with which processors 14 forward the second data packet.

In some examples, processors 14 may simply forward the first data packet and the second data packet to host 4 upon receiving the respective data packets. In other examples, as described above, processors 14 may implement some form of guard process to evaluate the first data packet received from non-secure client device 8A. Upon determining that the first data packet meets a threshold level of integrity, processors 14 may forward the first data packet to host 4 via port 12C. In still other instances, processors 14 may process information certain information regarding the second data packet (i.e., sender information or content information) prior to forwarding the second data packet to host 4.

In some examples, processors 14 of hub 10 may receive an outgoing message to be sent to non-secure client devices 8 or secure client devices 6. For instance, if the outgoing message is intended for one of secure client devices 6, processors 14 of hub 10 may forward the outgoing message to the one of secure client devices 6 without restriction or with restrictions based on the respective trust level of the one of secure client devices 6. For instance, host 4 may attempt to send an ACK message, or an acknowledgement message that verifies the receipt of the incoming data packets, to non-secure client device 8A. However, in response to determining that the outgoing message contains secure information, processors 14 of hub 10 may refrain from sending the outgoing message to non-secure client device 8A so as to protect the integrity of the secured system. In other instances, however, processors 14 of hub 10 may scan the outgoing message to determine whether the outgoing message contains secure information that would be improper for a non-secure client device to receive. In response to determining that the outgoing message does not contain secure information, processors 14 of hub 10 may send the outgoing message to non-secure client device 8A via port 12A. Processors 14 may only send the outgoing messages to the non-secure client devices 8A and/or 8B when a security policy has been set up with approvals to send the such messages to the respective non-secure client devices.

In some other examples, rather than expecting host 4 to produce and send ACK messages, processors 14 may utilize a proxy module to produce an ACK message. If processors 14 still receive the ACK message from host 4, processors 14 may block the received ACK message and utilize a proxy module to produce an ACK instead. For instance, if the first data packet was part of a TCP conversation, processors 14 may utilize the proxy module to create an ACK message and send the ACK message to non-secure client device 8A. In creating a separate ACK message at processors 14, hub 10 may maintain a one-way communication between host 4 and the non-secure client device, as the non-secure client device will not receive any data created by host 4.

In other examples, processors 14 of hub 10 may prevent all outgoing traffic from reaching non-secure client device 8A. In such examples, processors 14 of hub 10 may receive an outgoing message to be sent to non-secure client device 8A. Upon determining that the intended recipient of the outgoing message is a non-secure client device (i.e., non-secure client device 8A), processors 14 of hub 10 may refrain from sending the outgoing message to non-secure client device 8A so as to protect the operation and safety of the secured system.

While the techniques described with respect to FIG. 1 show different guard processes for different security classifications, processors 14 of hub 10 may also perform different guard processes on different data packets within the same security classification based on a data type of the respective data packets. For instance, non-secure client device 8A may use a first application to generate a first data packet having a first data type based on the first application, which non-secure client device 8A sends to hub device 10. Further, non-secure client device 8B may use a second application to generate a second data packet having a second data type based on the second application, which non-secure client device 8B sends to hub device 10. Although both the first and second data packets originated in the non-secure domain, processors 14 may perform different guard processes on the two data packets, based on the respective data types and the respective applications used to generate the data packets. This same differentiation between data types are also applicable to data packets generated by different applications on the same client device, or by the same application on different client devices.

Figure 2:
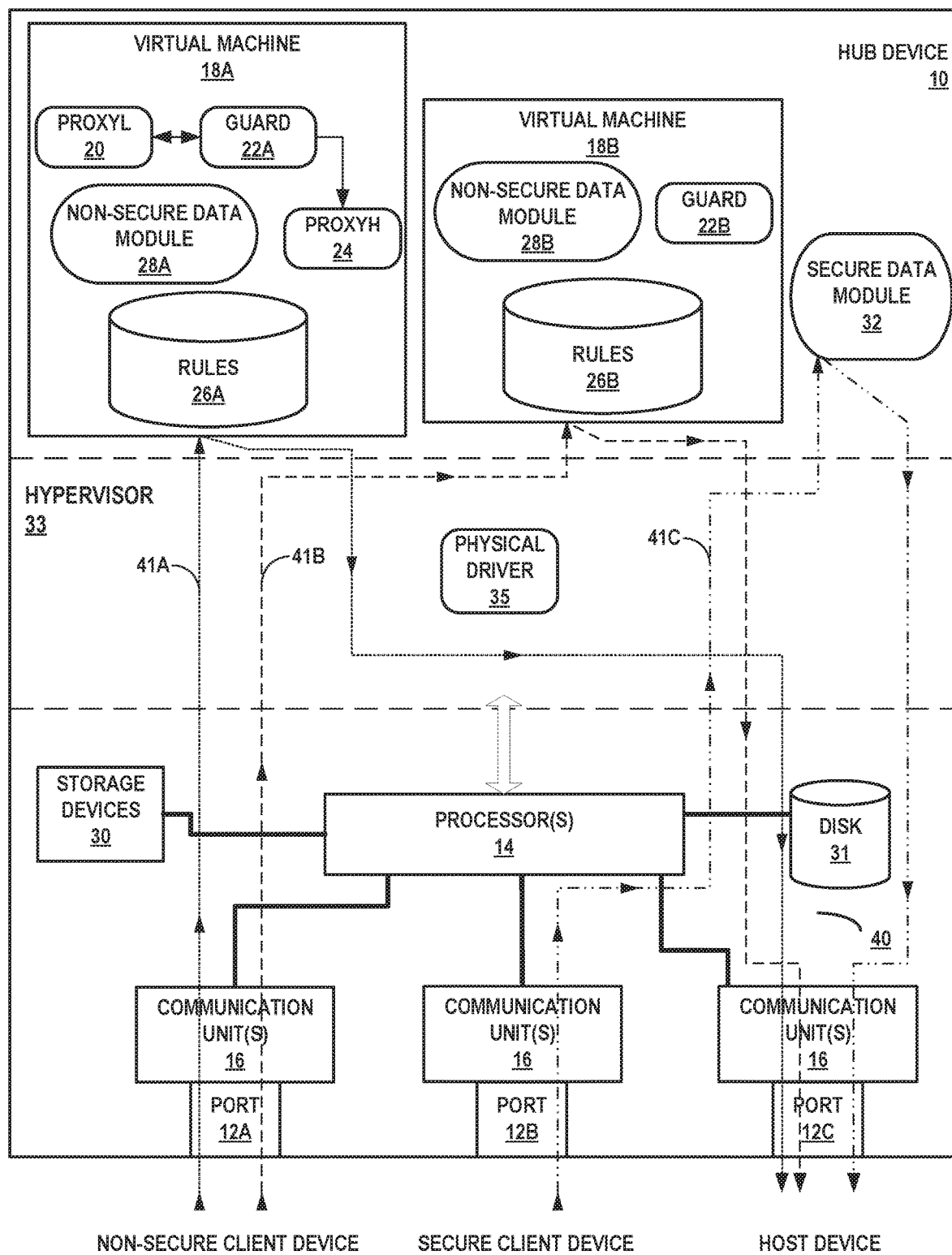
FIG. 2 is a block diagram illustrating an example hub device of FIG. 1 in more detail.

FIG. 2 is a block diagram illustrating a detailed example of hub device 10 configured to receive data packets from both secure client devices and non-secure client devices and to forward the received data packets to a host device, in accordance with one or more techniques of this disclosure. FIG. 2 illustrates some particular examples of hub 10, and many other examples of hub 10 may be used in other instances and may include a subset of the components included in example hub 10 or may include additional components not shown in FIG. 2.

For example, hub 10 may include a battery to provide power to the components of hub 10, or hub 10 may include more ports than three (e.g., four or more ports). Similarly, the components of hub 10 shown in FIG. 2 may not be necessary in every example of hub 10. For example, in some configurations, hub 10 may not include one or both of virtual machines 18A and 18B, meaning that only a single virtual machine may be included for handling data packets received from a non-secure source. However, for ease of illustration, hub 10 is shown in FIG. 2 to include both virtual machines 18A and 18B. As shown in the example of FIG. 2, hub 10 includes one or more processors 14, one or more communication units 16, virtual machines 18A and 18B executable by one or more processors 14, and one or more storage devices 30.

One or more storage devices 30 of hub 10 include virtual machines 18A and 18B and secure data module 32. One or more storage devices 30 may be configured to store information within hub 10 during operation. Storage device 30, in some examples, is described as a computer-readable storage medium. In some examples, storage device 30 is a temporary memory, meaning that a primary purpose of storage device 30 is not long-term storage. Storage device 30, in some examples, are described as volatile memories, meaning that storage device 30 does not maintain stored contents when the computing device is turned off. Examples of volatile memories include random access memories (RAM), dynamic random access memories (DRAM), static random access memories (SRAM), and other forms of volatile memories known in the art. In some examples, storage device 30 is used to store program instructions for execution by processors 14.

Storage devices 30, in some examples, also include one or more computer-readable storage media. Storage devices 30 may be configured to store larger amounts of information than volatile memory. Storage devices 30 may further be configured for long-term storage of information. In some examples, storage devices 30 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Disk 31 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor 14.

Communication channels 40, represented by the solid lines in FIG. 2, may interconnect each of (or some subcombination of) the components 14, 16, 12A, 12B, 12C, and 30 for inter-component communications (physically, communicatively, and/or operatively). In some examples, communication channels 40 may include a system bus, a network connection, an inter-process communication data structure, or any other method for communicating data. The communication channels for a particular set of components may be isolated from another set of components.

Virtual data paths 41A-41C, represented by the dotted lines of various patterns, represent virtual connections within hub 10. For instance, data packets may be received by one of ports 12A-12C and be processed by one of virtual machines 18A-18B or secure data module 32. After being processed, the data packets may be output to a different device via another one of ports 12A-12C. Although each of virtual data paths 41A-41C is shown as being received by one of ports 12A or 12B and being output by port 12C, each of the data paths may be reversed. In other words, port 12C may receive data from the host device to be output to non-secure client devices or secure client devices via ports 12A or 12B.

One or more communication units 16 of hub 10 may communicate with external devices, such as a server device, a host device, secure client devices, and/or non-secure client devices, via one or more wired and/or wireless networks by transmitting and/or receiving network signals on the one or more networks. Communication units 16 may include a network interface card, such as an Ethernet card, an optical transceiver, a radio frequency transceiver, or any other type of device that can send and receive information. Examples of such network interfaces may include Bluetooth, infrared signaling, 3G, LTE, and Wi-Fi radios as well as Universal Serial Bus (USB) and Ethernet. In some examples, hub 10 utilizes communication units 16 to wirelessly communicate with another computing device that is operably coupled to hub 10, such as host device 4, secure client devices 6, and/or non-secure client devices 8 of FIG. 1.

In some examples, communication units 16 may include a sufficient number of communication units such that each of ports 12A-12C connects to components in hub 10 through a respective communication unit. In other words, port 12A may utilize a first one of communication units 16 to receive data packets from an outside computing device and to send the received data packets to the correct units for processing. In other examples, the respective ports 12A-12C may be configured to automatically send the received packets to the correct units on its own. In other words, communications channels for different sets of components can be isolated.

One or more processors 14, in one example, are configured to implement functionality and/or process instructions for execution within hub 10. For example, processors 14 may be capable of processing instructions stored in storage device 30. Examples of processors 14 may include, any one or more of a microprocessor, a controller, a digital signal processor (DSP), an application specific integrated circuit (ASIC), a field-programmable gate array (FPGA), or equivalent discrete or integrated logic circuitry.

Hub 10 executes a hypervisor 33 to manage virtual machines 18. Example hypervisors include Kernel-based Virtual Machine (KVM) for the Linux kernel, Xen, ESXi available from VMware, Windows Hyper-V available from Microsoft, and other open-source and proprietary hypervisors. Hypervisor 33 may represent a virtual machine manager (VMM). Hypervisor 33 includes a physical driver 35 to use the physical function provided by a network interface card.

The VCSF framework of the techniques described herein may be built upon hypervisor 33, with either additional modules to those shown in FIG. 2 or less modules than those shown in FIG. 2. For instance, virtual machine 18A may be separated into two virtual machines, one of which handles the flow of traffic from the non-secure devices to the secure end-user device, and one of which handles the flow of traffic from the secure end-user device to the non-secure devices. In other instances, proxyL 20 and proxyH 24 may be removed from virtual machine 18A and instead placed in separate, respective virtual machines. In such instances, proxyL 20 and its respective virtual machine handle all incoming traffic flowing towards the end-user device (regardless of the security domain of the sender) and all outgoing traffic flowing back towards the sender, and where proxyH 24 and its respective virtual machine handle all outgoing traffic flowing towards the end-user device and all incoming traffic received from the end-user device.

In order to simplify FIG. 2, only two virtual machines 18A and 18B have been included. In general, virtual machine 18A may handle all traffic originating from or being sent to non-secure client devices with proxies, while virtual machine 18B may handle all traffic originating from or being sent to non-secure client devices without proxies. However, the various operations performed by virtual machines 18, and the various components of virtual machines 18, may be split or combined into any number of virtual machines. Virtual machine functionality may be split into separate virtual machines to provide better isolation of data flows between the high side (i.e., the secure domain) and the low side (i.e., the non-secure domain). Further, while secure data module 32 is not shown as being part of a virtual machine, an additional virtual machine that includes secure data module 32 or that performs the functions performed here by secure data module 32 may be included in hub device 10.

Each of virtual machines 18 may include a virtual driver presented directly into the virtual machine guest operating system, effectively bypassing hypervisor 33 to offer direct communication between communication units 16 and the virtual machine. This may reduce hypervisor 33 overhead involved with software-based, vSwitch implementations.

Hub 10 may include virtual machines 18A and 18B (collectively, virtual machines 18), and secure data module 32. Each of virtual machines 18A and 18B may include a respective non-secure data module 28A and 28B. Modules 28A, 28B, and 32 may perform operations described using software, hardware, firmware, or a mixture of hardware, software, and firmware residing in and/or executing at hub 10. Hub 10 may execute modules 28A, 28B, and 32 with one or more processors. Hub 10 may execute modules 28A, 28B, and 32 as a virtual machine executing on underlying hardware. Modules 28A, 28B, and 32 may execute as a service or component of an operating system or computing platform. Modules 28A, 28B, and 32 may execute as one or more executable programs at an application layer of a computing platform. Modules 28A, 28B, and 32 may be otherwise arranged remotely to and remotely accessible to hub 10, for instance, as one or more network services operating at a network in a network cloud. In other words, modules 28A, 28B, and 32 may not be executing at hub 10. Instead, modules 28A, 28B, and 32 may be executing at a remote computing system (e.g., a server).

Virtual machines 18 and secure data module 32 may be stored in long-term storage, such as storage 30. However, when virtual machines 18 or secure data module 32 are executed by processor 14, processor 14 may read virtual machines 18 or secure data module 32 into volatile memory, such as disk 31. Virtual machines 18 or secure data module 32 may be stored in disk 31 throughout processor 14's execution of virtual machines 18 or secure data module 32.

Virtual machines 18 may be an emulation of a computer system. Virtual machines 18 may be based on computer architectures and provide functionality of a physical computer. Virtual machines 18 may be implemented in hub 10 using specialized hardware, software, or a combination thereof. Virtual machines 18 may be process virtual machines designed to execute the techniques described herein in a platform-independent environment. Specifically, each of virtual machines 18 may be designed to execute the guard and filtering techniques for data packets received from a non-secure client device. Although shown as virtual machines, virtual machines 18A and/or 18B may instead be containers. In such instances, a kernel of hypervisor 33 may allow for multiple, distinct virtualization engines that may enable the performance of the techniques described herein. Each of virtual machines 18A and 18B may include various hardware or software components to perform the techniques of this disclosure. These components are described in greater detail below.

In accordance with the techniques of this disclosure, processors 14 of hub 10 may receive, via port 12A, a first data packet from a non-secure client device. For example, the non-secure client device may be a UAV attempting to send data (e.g., a full motion video TCP stream) to the host device. The UAV may not be configured to operate in accordance with a trusted or secure protocol. However, the UAV may still generate information that would be beneficial to transmit to host 4. As such, the UAV may transmit the data packets associated with the TCP stream to hub 10 via port 12A. In examples where hub 10 includes virtual machine 18A, the first data packet may generally follow path 41A, i.e., the first data packet may be received by port 12A, analyzed using virtual machine 18A, and output via port 12C. In other examples where hub 10 includes virtual machine 18B, the first data packet may generally follow path 41B, i.e., the first data packet may be received by port 12A, analyzed using virtual machine 18B, and output via port 12C.

Processors 14 of hub 10 may also receive, via port 12B, a second data packet from a secure client device. For instance, the secure client device may be a global positioning system (GPS) device that transmits data packets that include various locations to hub 10 over a secure channel. Host 4 may request a status update from a user of the GPS with regards to the location of the GPS, and the GPS may respond by transmitting the data packets to hub 10 via port 12B. The second data packet, upon being received at port 12B, may generally follow path 41C within hub 10, i.e., the second data packet may be received by port 12B, analyzed using secure data module 32, and output via port 12C.

In some examples, based on the sender of the respective data packet, processor 14 may perform separate guard processes on the respective data packet. For instance, non-secure data modules 28A and/or 28B may receive the non-secure data packet from port 12A and perform a first guard process on the first data packet based on the security classification of the UAV (i.e., non-secure or untrusted) and secure data module 32 may perform a second guard process on the second data packet based on the security classification of the GPS (e.g., a secure security classification, such as secret, top secret, classified, or protected). For the second guard process, in some instances, secure data module 32 may simply forward the second data packet to the host device via port 12C. In other instances, for the second guard process, secure data module 32 may analyze contents of the second data packet to determine an identity of the sender of the second data packet or the type of contents in the second data packet prior to forwarding the second data packet to the host device via port 12C. As the second data packet may come from a verified secure and trusted client device, secure data module 32 may refrain from determining an integrity of the received data and performing a virus scan operation on the second data packet.

For the first guard process, non-secure data module 28A or 28B may execute the respective guard process 22A or 22B to perform an integrity check on the first data packet based at least in part on a type of connection between hub 10 and the non-secure client device and a data type of the first data packet. In other words, the data packet may have a different structure depending on the type of data stored within the data packet and the protocol used to transmit the data packet to hub 10. As such, the specific method for determining the integrity of the first data packet may vary based on the expected structure of the first data packet. Non-secure data module 28A or 28B may determine an expected structure of the first data packet based at least in part on type of connection between hub 10 and the non-secure client device and the data type of the first data packet. Non-secure data module 28A or 28B may also determine an actual structure of the first data packet and compare the actual structure with the expected structure. If non-secure data module 28A or 28B determines that the actual structure of the first data packet matches the expected structure of the first data packet, non-secure data module 28A or 28B may determine that the first data packet passes the integrity check and send the first data packet to the host device via port 12C. Conversely, if non-secure data module 28A or 28B determines that the actual structure of the first data packet does not match the expected structure of the first data packet, non-secure data module 28A or 28B may determine that the first data packet fails the integrity check and block the first data packet from reaching the host device.

Part of the integrity check may include non-secure data modules 28A and 28B determining that the actual structure of the first data packet matches an expected structure based on the type of data stored within the data packet and the protocol used to transmit the data packet to hub 10. For instance, if the UAV sends the TCP stream using Wi-Fi, non-secure data modules 28A and 28B may expect the first data packet to have a particular structure with particular bitfields filled out in particular ways. Non-secure data modules 28A and 28B may determine that the first data packet passes the integrity check if the bitfields match the expected structure.

Another part of the integrity check may include non-secure data modules 28A and 28B performing a virus scan operation on the first data packet. The virus scan operation may include comparing certain values within the data packet to known virus or malware structures. If non-secure data modules 28A and 28B determine that the first data packet contains a virus or malware, then non-secure data modules 28A and 28B may block the first data packet from reaching the host device. Conversely, if non-secure data modules 28A and 28B determines that the virus scan operation shows no harmful data in the first data packet, non-secure data modules 28A and 28B may forward the first data packet to the host device via port 12C.

Secure data module 32 and non-secure data modules 28A and 28B of hub 10 may send, via port 12C, the first data packet and the second data packet to the host device. The respective data modules may forward the respective data packets to host device 4 either upon receipt of the respective data packets or after the respective data packets have been processed. In other words, the respective data modules may not necessarily forward the first data packet and the second data packet simultaneously, but instead forward the first data packet and the second data packet after the respective data modules determines the respective data packet to be safe to forward to the host device in the respective data packet's own respective processing loop. The timing with which non-secure data modules 28A and/or 28B forward the first data packet is independent of the timing with which secure data module 32 forwards the second data packet.

In some examples, modules 28A, 28B, and 32 may simply forward the first data packet and the second data packet to the host device upon receiving the respective data packets. In other examples, as described above, modules 28A and 28B may implement some form of guard process to evaluate the first data packet received from the non-secure client device. Upon determining that the first data packet meets a threshold level of integrity, non-secure data modules 28A and 28B may forward the first data packet to the host device via port 12C. In still other instances, secure data module 32 may process certain information regarding the second data packet (e.g., sender information or content information) prior to forwarding the second data packet to the host device.

In some examples, non-secure data module 28A or 28B of hub 10 may receive an outgoing message to be sent to the non-secure client device. For instance, the host device may attempt to send an ACK message to the UAV. In some instances, non-secure data modules 28A and 28B of hub 10 may prevent all outgoing traffic from reaching non-secure client device 8A. In such examples, non-secure data module 28A or 28B of hub 10 may receive an outgoing message to be sent to the non-secure client device. Upon determining that the intended recipient of the outgoing message is a non-secure client device (e.g., the UAV), non-secure data module 28A or 28B of hub 10 may refrain from sending the outgoing message to the non-secure client device so as to protect the integrity of the secured system.

In other examples, hub 10 may forward the ACK message to the non-secure client device. Prior to forwarding the ACK message, non-secure data module 28A or 28B of hub 10 may scan the outgoing message to determine whether the outgoing message contains secure information that would be improper for a non-secure client device to receive based on various security protocols that hub 10 must operate within. In response to determining that the outgoing message does not contain secure information, non-secure data module 28A or 28B of hub 10 may send the outgoing message to the non-secure client device via port 12A. However, in response to determining that the outgoing message contains secure information, non-secure data module 28A or 28B of hub 10 may refrain from sending the outgoing message to the non-secure client device so as to protect the integrity of the secured system.

In some other examples, rather than waiting for the host device to produce and send ACK messages, virtual machine 18A may utilize proxy modules 20 and 24 to produce an ACK message. If non-secure data module 28A or 28B still receives the ACK message from the host device, guards 22A or 22B may block the received ACK message and utilize a proxy module to produce an ACK instead. For instance, if the first data packet was part of a TCP message, non-secure data module 28A may utilize the proxy modules 20 and 24, as described below, to create an ACK message and send the ACK message to the non-secure client device. By enabling hub 10 to create the ACK messages, outgoing communication from the host device to the non-secure client device is further limited or prevented. In creating a separate ACK message at ProxyL 20, hub 10 may maintain a one-way communication between the host device and the non-secure client device, as the non-secure client device will not receive any data created by the host device.

Depending on the final needs and requirements of the solution, both virtual machines 18A and 18B may be used as configurable options in addition to more or different types of flow controls. In the example of FIG. 2, virtual machine 18A uses two proxies 20 and 24, a high-side Proxy (e.g., ProxyH 24, or a proxy module located on the host-side of guard 22A) and a low-side proxy (e.g., ProxyL 20, or a proxy module located on the client-side (or low side) of guard 22A). Non-secure data module 28A may execute each of these proxies 20 and 24 to mimic or block the reverse packet flow in a TCP connection when no high to low traffic is required. A TCP application on the low side may expect ACKs and various feedback, including handshaking information, from the ultimate host device. ProxyL 20 may mimic or create these ACK messages as if ProxyL 20 were the actual endpoint, thus completing the data exchange loop needed for a full TCP connection. The TCP packets are then wrapped or modified to be user diagram protocol (UDP) packets and sent into the guard process where the flow is validated according to the configured flow type rules. Guard 22A may execute a guard process before ProxyL 20 handles the TCP connection. ProxyH 24 receives the ACKs and various TCP feedback and drops all traffic. ProxyH 24 may also receive the UDP packets from guard 22A and convert the UDP packets into TCP packets to forward on to an app on the host device.

Virtual machine 18B shows a simpler filtering technique that only includes guard 22B and does not mimic the TCP ACKs. In this example, traffic may flow both from the non-secure client device to the host device and from the host device to the non-secure client device. As such, the host device may generate the TCP ACK messages, which hub 10 may forward to the non-secure client device. Guard 22B may implement the same or more virus detection, deep packet inspection and other safeguards guard 22A.

In some examples, the cross-domain system in FIG. 2 may be implemented with or without virtual machines 18A and 18B. Virtual machines 18 may isolate the "low" traffic and "low" network interfaces from the rest of hub 10. However, other implementations of the functionality of each of virtual machines 18 may be utilized to perform the techniques of this disclosure.

Figure 3:
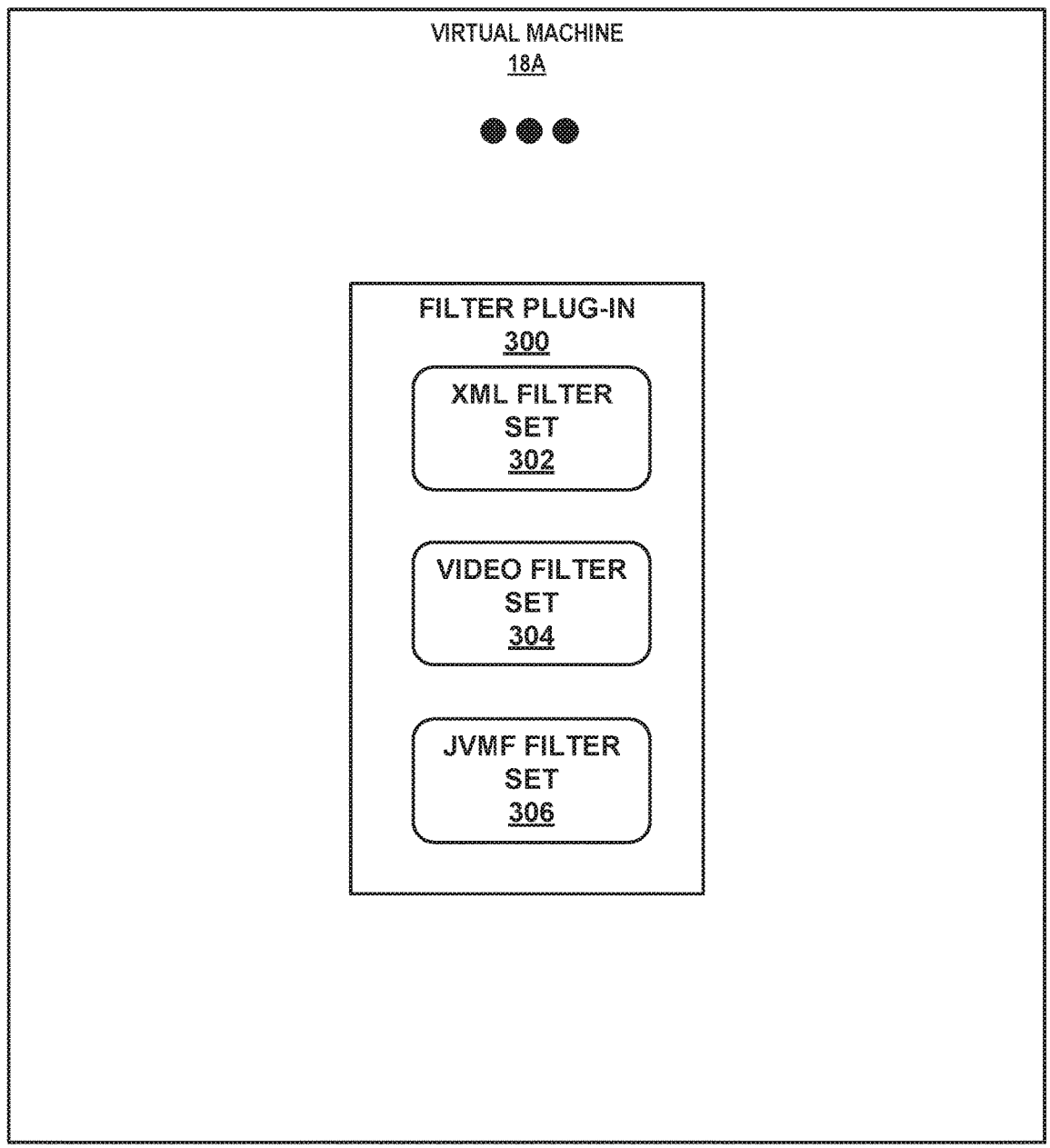
FIG. 3 is a block diagram illustrating an example optional plug-in module for a guard of the example hub device of FIG. 2, in accordance with one or more techniques of this disclosure.

FIG. 3 is a block diagram illustrating an example optional filter plug-in module 300 for virtual machine 18A of the example hub device of FIG. 2, in accordance with one or more techniques of this disclosure. Virtual machines 18 may be designed, in some instances, with filters that are redundant (e.g., invoked two or more times for each unique function) and always invoked (e.g., in a pipeline pattern). Further, the data flow may be designed such that components and filters cannot be circumvented in order to ensure the integrity and safety of the data transitioning between the secure and the non-secure domains.

One method of achieving this redundancy and security is to include filter plug-in 300 into, for example, virtual machine 18A (or any virtual machine of a set of virtual machines that handle traffic flows from non-secure client devices to the secure end-user device). Filter plug-in 300 may be a software module that may be included in hub device 10 and executed by virtual machine 18A to perform the various filter operations described above.

Each of extensive markup language (XML) filter set 302, video filter set 304, and joint variable message format (JVMF) filter set 306 may include a plurality of filters that each execute the filter for the data type the filter is designed for. For instance, XML filter set 302 may include two or more filters that each perform the same filtering operations for all XML data traffic flowing from a non-secure client device to a secure end-user client device, providing redundant and unavoidable security for the XML traffic. Similarly, video filter set 304 and JVMF filter set 306 may perform the same filtering operations for all video data traffic and all JVMF data traffic, respectively, flowing from a non-secure client device to a secure end-user client device, providing redundant and unavoidable security for the video and JVMF traffic.

In other examples, the redundancy and security may be replicated by instead incorporating multiple virtual machines into the data path, with each virtual machine containing similar components and performing similar functions. For instance, in the example of FIG. 2, a second virtual machine with components at least similar to virtual machine 18A may be included in hub device 10, with virtual machine 18A, after applying a first filter to the data traffic, passing the data flow to the second virtual machine that will apply a second filter to the data traffic, with the first filter and the second filter having the same process. Other filters include filters for bitmap (BMP) files, exchangeable image files (EXIFs), joint photographic group (JPG) files, graphics interchange format (GIF) files, portable network graphics (PNG) files, tagged image file format (TIFF) files, moving picture experts group (MPEG and MPEG2) files, cascading style sheet (CSS) files, hypertext markup language (HTML) files, hypertext transfer protocol (HTTP) filters, text document files (e.g., DOC or DOCX), spreadsheet files (e.g., XLS or XLSX), slideshow presentation files (e.g., PPT or PPTX), portable document format (PDF) files, rich text format (RTF) files, waveform audio file format (WAVE) files, wavelet scalar quantization (WSQ) image files, enhanced metafiles (EMFs), Windows® metafiles (WMFs), archived file format (e.g., ZIP) files, drawing standards (DWS) files, CleanContent® files, audio filter files, other text filters, or any other type of files that could contain secure information and/or malicious executables.

The various filters may be responsible for deep content inspection and sanitization. The inspection may be based on a full understanding of the syntactic structure and the semantic meaning of the various file formats. The filters may also verify that the submitted files are of the correct type and ensure that the data conforms with various format specifications. Based on defined policies, the filters may verify that the files do not contain any suspect, hidden, or malicious content. In the sanitization process, the filters may, based on defined policies, sanitize (e.g., clear or modify) the file's content of any suspect, hidden, or malicious content using a new file or template.

The filters may also randomize files of internal structure. For instance, based on known file structures, the filters may obfuscate and mix up/reorder data in the files. In doing so, the filters do not rely on signatures or knowledge of previous attacks. Further, the resulting file is typically close to the original file with only minimal damage or changes. This process is a reliable mechanism for valid text extraction for word searching and is difficult to trick.

The filters may also perform format conversion, transforming files and data using defined policies. The filters may also transliterate files and data using defined policies (e.g., convert from one character set encoding to another). The filters may further convert a file to a related format, then convert the file back to the original file format (e.g., PDF to postscript and then back to PDF). In doing so, the filters can disrupt malware by altering the file, remove unwanted or risky feature in the conversion process, and remove hidden data when layers are removed.

The filters may also perform a canonicalization process, which converts content from a specialized form to a standardized (e.g., canonical) or raw form. In doing so, there is no loss of fidelity in the data during the canonicalization process, and the filters can remove malware, malware C2 communications, and data exfiltration through some types of covert channels. The filters may also use the canonicalization process as a protocol break that works very well for imagery, video, and audio.

The filters may further perform a flattening process, or converting to another file/protocol which is less complex. This is effective in removing data attacks and can reduce data hiding attacks (by removing layers). If the filters use recursion and decomposition in the flattening process, complex documents (e.g. PDF documents) and container file formats (e.g. ZIP files) that are made of various files each may be handled individually. The decomposition process extracts files (e.g. images/objects) or content (e.g. text), and the filter sends decomposed objects recursively through the filter pipeline for additional deep content inspection and sanitization. Filters may set limits on the amount of recursion to prevent resource exhaustion attacks.

Figure 4:
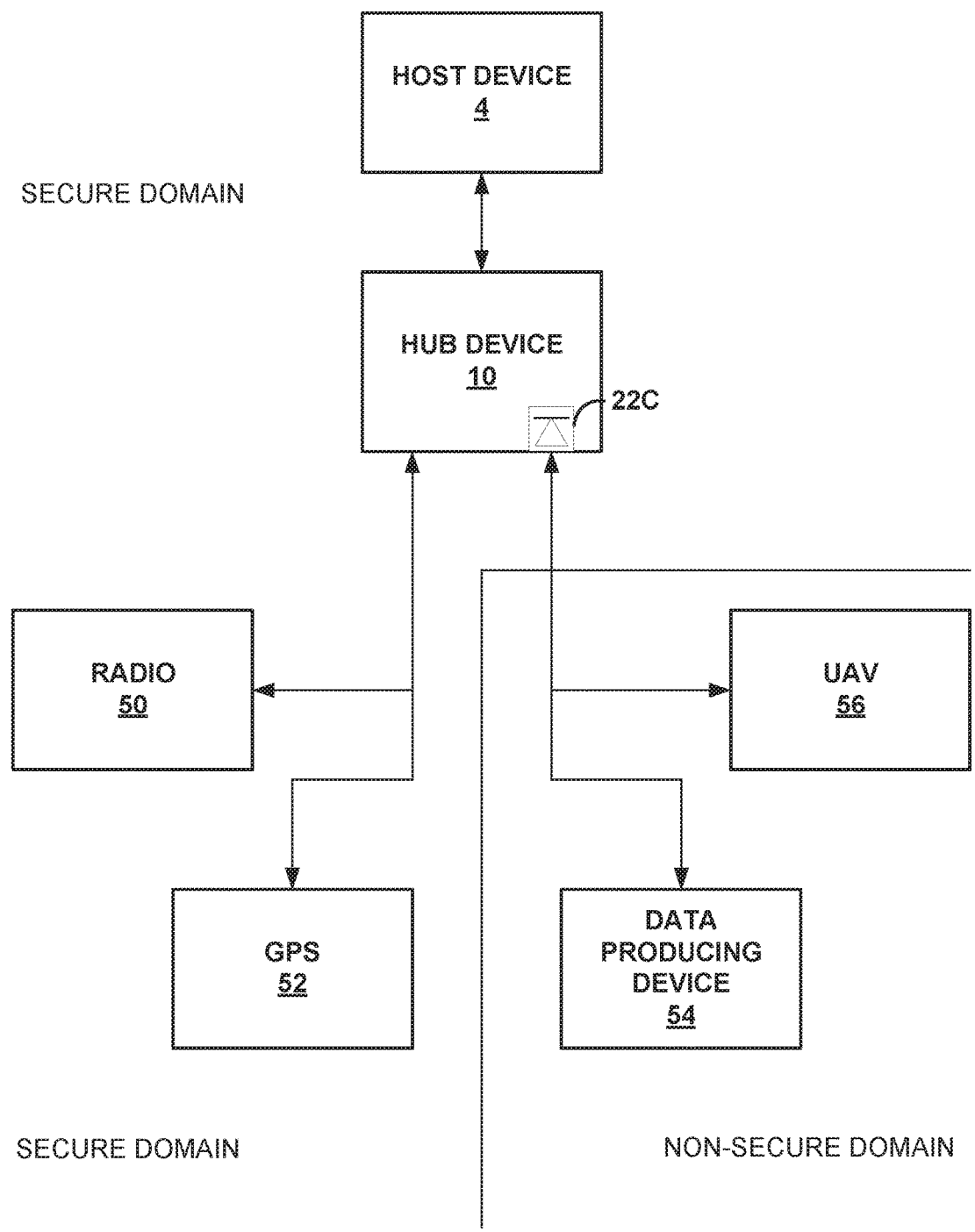
FIG. 4 is a block diagram illustrating an example system that includes a hub device configured to block outgoing communications to the non-secure client devices, in accordance with one or more techniques of this disclosure.

FIG. 4 is a block diagram illustrating an example system that includes hub device 10 configured to receive data packets from both secure client devices 50 and 52 and non-secure client devices 54 and 56, forward the received data packets to host device 4, and block outgoing communications to non-secure client devices 54 and 56, in accordance with one or more techniques of this disclosure. The techniques of FIG. 4 may be performed by one or more processors of a computing device, such as hub 10 illustrated in FIG. 1 and/or FIG. 2. For purposes of illustration only, the techniques of FIG. 3 are described within the context of hub 10 of FIG. 1, although computing devices having configurations different than that of hub 10 may perform the techniques of FIG. 3.

One option for controlling the outgoing traffic to non-secured client devices 54 and 56 is for guard 22C (similar to guards 22A and 22B of FIG. 2) in hub 10 to control the outgoing traffic from hub 10 to non-secured client devices 54 and 56. In this option, guard 22C may be implemented as part of hub 10 or operably connected to hub 10 and may allow general traffic to flow in only one direction (i.e., from the non-secure client devices 54 and 56 to hub device 10). In one instance, the data flow being in only one direction is absolute and all outgoing data from hub device 10 to non-secure client devices 54 and 56 is blocked at guard 22C. However, this absolute block may break TCP network protocols and other protocols that require small ACK or acknowledgment packets to flow back to data producing device 54 and UAV 56. In another instance, guard 22C may utilize dynamic filtering options for one-way packet filtering with ACKs going back to the sender (e.g., data producing device 54 and UAV 56). In this instance, guard 22C may be involved with more processing and may have more dynamic capabilities. In the example of FIG. 4, guard 22C may be configured to monitor and control the outgoing traffic to non-secure client devices 54 and 56 universally, needing only the single guard 22C to monitor and control the outgoing traffic regardless of the connection type or the device type of the ultimate non-secure client device 54 and 56.

Contrast this with the "bump-in-the-wire" approach. In this option, guard 22C would be implemented as a respective intermediary on each of the connections between non-secured client devices 54 and 56 and hub 10 to allow traffic to flow in only one direction (i.e., from the non-secure client devices 54 and 56 to hub device 10). Each of the guards would need to be configured independently, as there may not be a common interface for network devices 58A and 58B. Further, a separate guard would be needed for each and every potential connection with a non-secure client device, further increasing the complexity and variability of the overall system.

Another contrasting example to the example of FIG. 4 is to install a separate device (i.e., a cross-domain guard) inline between non-secure client devices 54 and 56 and hub 10. The cross-domain guard may apply the one-way filtering techniques of allowing TCP ACK packets to flow from hub 10 to data producing device 54 and UAV 56 to provide the packet filtering for one-way communication with limited acknowledgement capability. However, each non-secure client device 54 and 56 would still need a respective cross-domain guard device, and each cross-domain guard device may have to be configured independently. Further, a separate cross-domain guard would be needed for each and every potential connection with a non-secure client device, further increasing the complexity and variability of the overall system.

Figure 5:
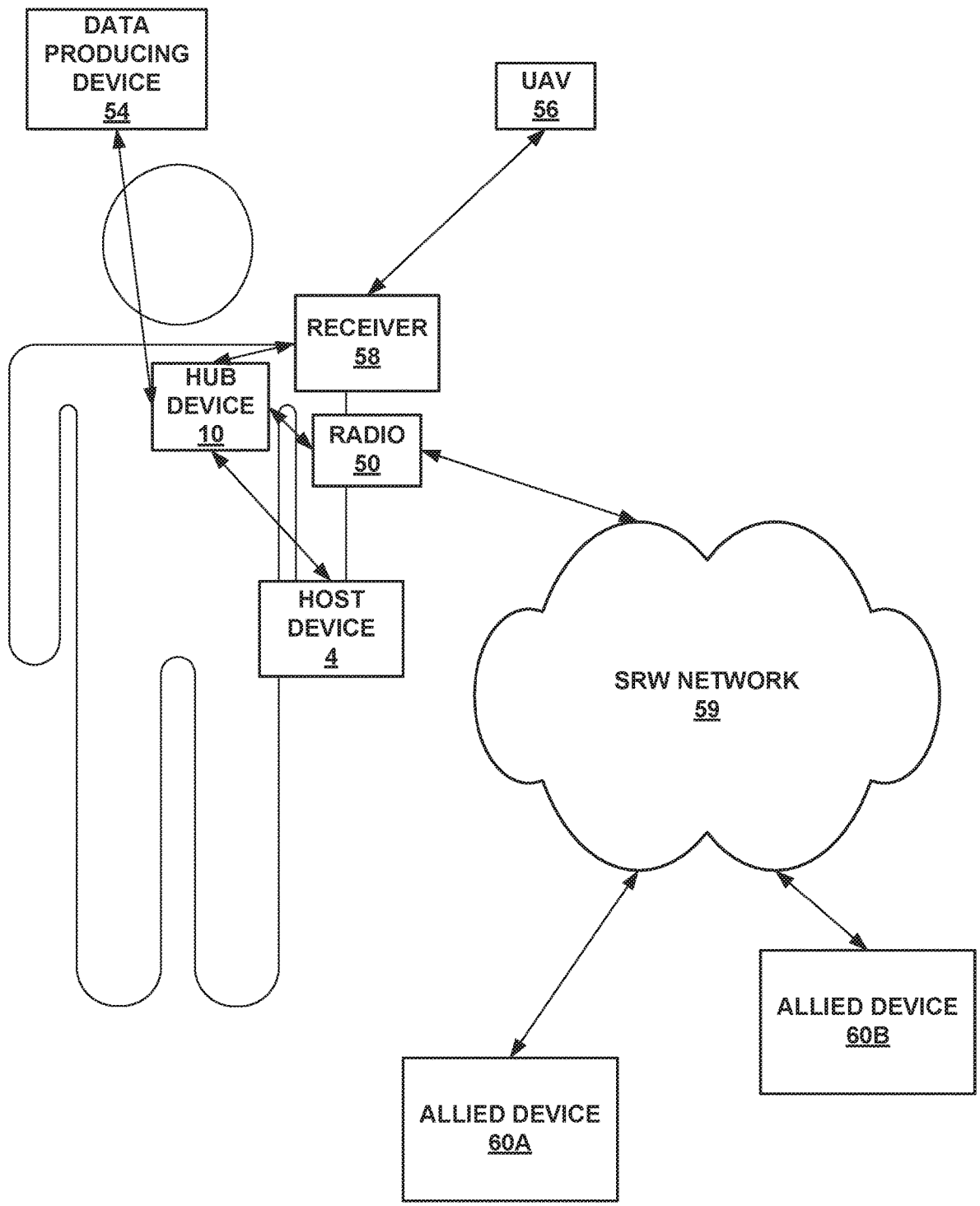
FIG. 5 is a block diagram illustrating an example system that includes a wearable hub device, in accordance with one or more aspects of this disclosure.

FIG. 5 is a block diagram illustrating an example system that includes a wearable hub device 10, in accordance with one or more aspects of this disclosure. The techniques of FIG. 5 may be performed by one or more processors of a computing device, such as hub 10 illustrated in FIG. 1 and/or FIG. 2. For purposes of illustration only, the techniques of FIG. 5 are described within the context of hub 10 of FIG. 1, although computing devices having configurations different than that of hub 10 may perform the techniques of FIG. 5.

In the example of FIG. 5, hub 10 may be connected to non-secured data producing device 54 and receiver 58, which receives information from non-secured UAV 56. Hub 10 is further connected to secured radio 50, which receives communications from allied devices 60A and 60B over a radio network (such as secure radio network 59), which may be a secured network. Since hub 10 is a wearable device, hub 10 may be used by soldiers in the field. Rather than only connecting a single device to host device 4 at any given time, hub 10 may enable multiple devices, both secured and non-secured, to connect to host 4 simultaneously, greatly increasing the efficiency of various operations that the soldier in the field may be tasked with performing.

Figure 6:
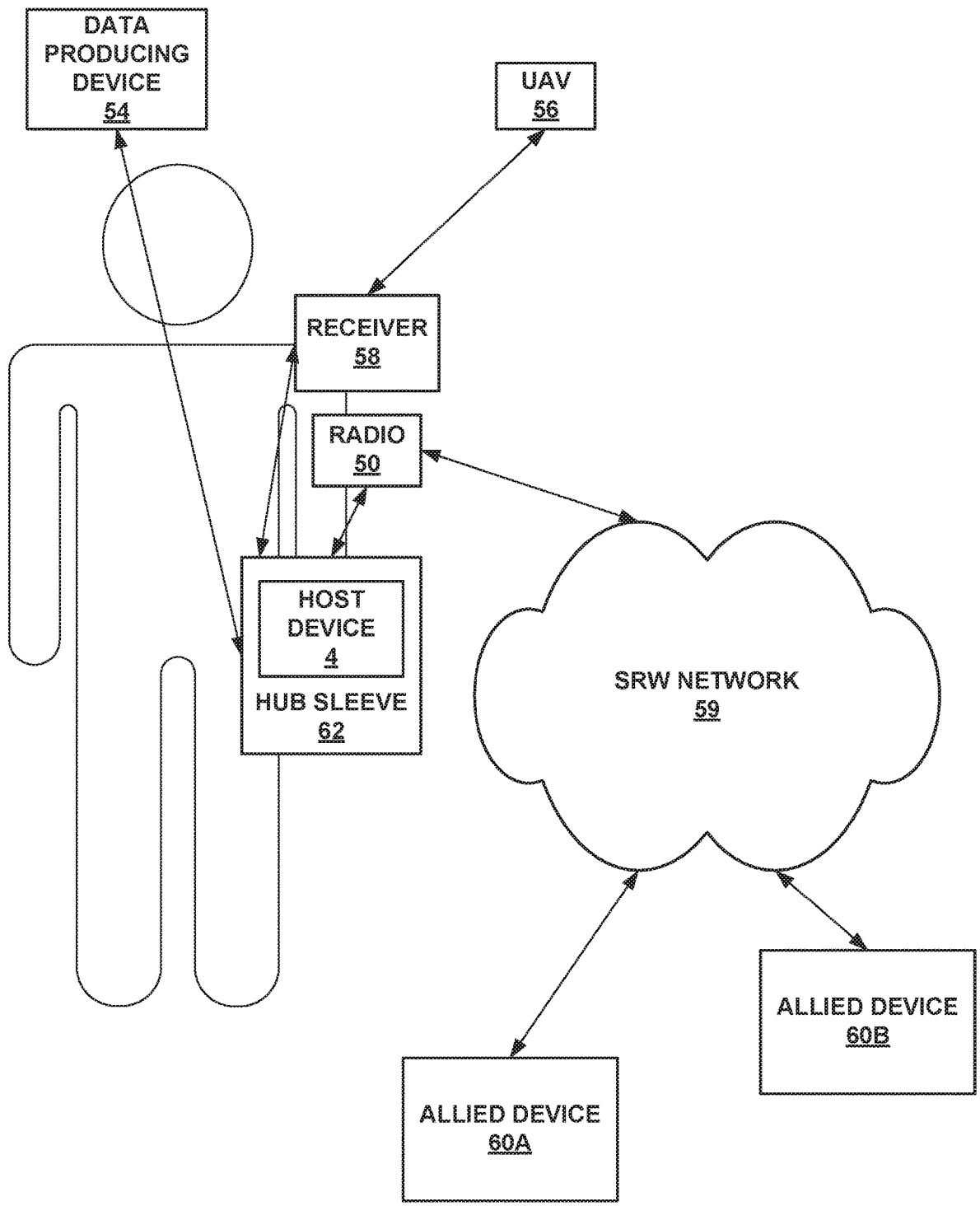
FIG. 6 is a block diagram illustrating an example system that includes a wearable hub device in the form of a sleeve around the host device, in accordance with one or more aspects of this disclosure.

FIG. 6 is a block diagram illustrating an example system that includes a wearable hub device in the form of hub sleeve 62 around host device 4, in accordance with one or more aspects of this disclosure. The techniques of FIG. 6 may be performed by hub sleeve 62, which may have similar functionalities to hub 10 illustrated in FIG. 1 and/or FIG. 2.

Hub sleeve 62 may generally include any mechanism for attaching a hub device, such as hub 10, to the body, clothing, or uniform of a user, or to host 4 itself. Hub sleeve 62 may also include an external CPU that may connect to host 4 rather than hub 10, which is a separate device. However, hub sleeve 62 may still perform the same functions of hub 10, including connecting to multiple devices, both secured and non-secured, and perform particular guard processes on the received non-secured data packets, in accordance with the techniques described throughout this disclosure.

In the example of FIG. 6, hub sleeve 62 may be connected to non-secured data producing device 54 and receiver 58, which receives information from non-secured UAV 56. Hub sleeve 62 is further connected to secured radio 50, which receives communications from allied devices 60A and 60B over secure radio network 59, which may be a secured network. Since hub sleeve 62 is a wearable device that is attached to host 4, hub sleeve 62 may be used by soldiers in the field. Rather than only connecting a single device to host 4 at any given time, hub sleeve 62 may enable multiple devices, both secured and non-secured, to connect to host 4 simultaneously, greatly increasing the efficiency of various operations that the soldier in the field may be tasked with performing.

Figure 7:
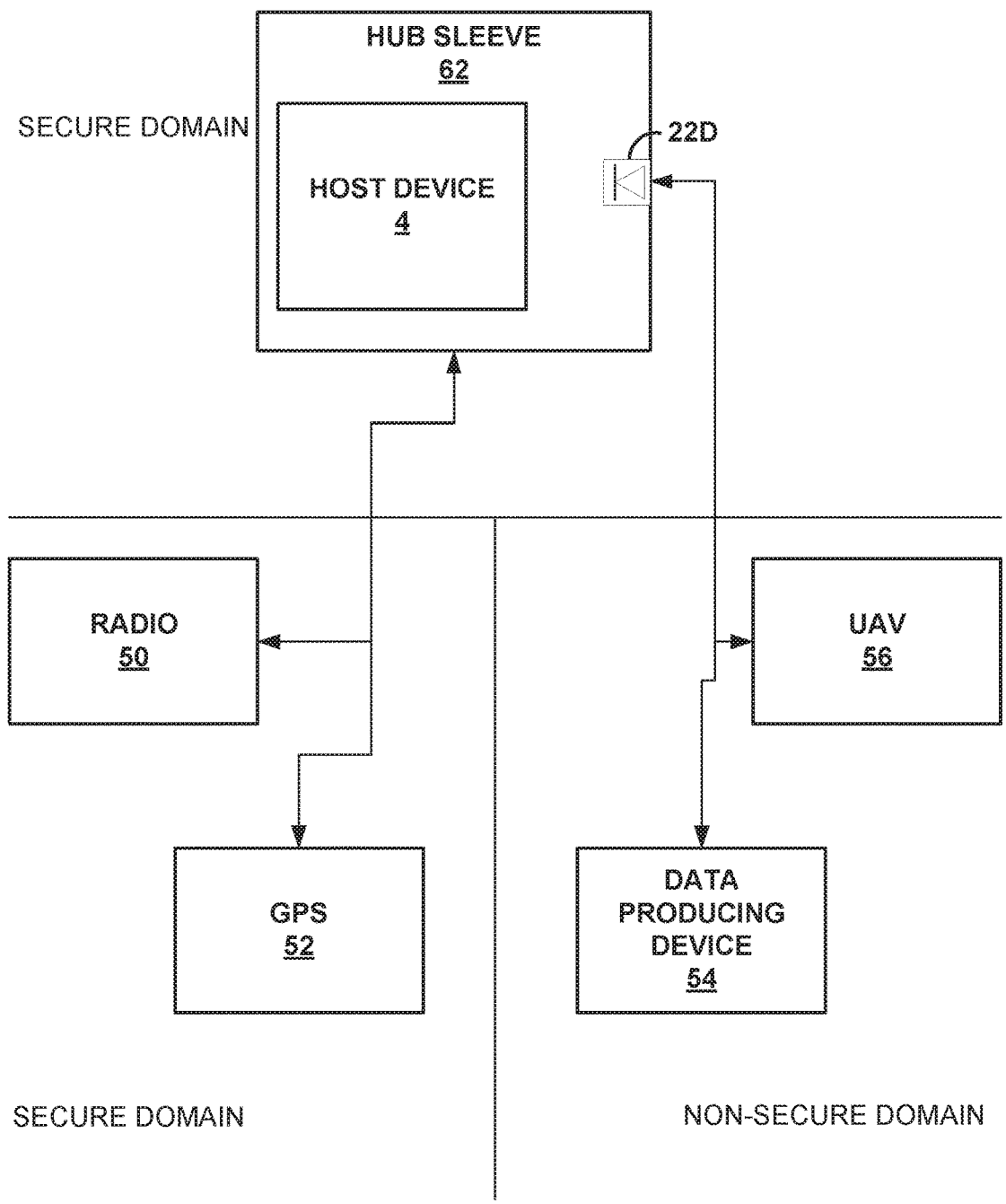
FIG. 7 is a block diagram illustrating an example system that includes a hub device in the form of a sleeve around the host device, in accordance with one or more aspects of this disclosure.

FIG. 7 is a block diagram illustrating an example system that includes hub sleeve 62 configured to receive data packets from secure client devices 50 and 52 and forward the received data packets to a host device 4. Hub sleeve 62, which is attached to host device 4, is further configured to receive data packets from non-secure client devices 54 and 56 and control outgoing communications to the non-secure client devices 54 and 56, in accordance with one or more aspects of this disclosure. The techniques of FIG. 7 may be performed by one or more processors of a computing device, such as hub 10 illustrated in FIG. 1 and/or FIG. 2. For purposes of illustration only, the techniques of FIG. 7 are described within the context of hub 10 of FIG. 1, although computing devices having configurations different than that of hub 10 may perform the techniques of FIG. 7.

In another example, the guard functionalities may be implemented in an advanced CPU within hub sleeve 62 operably connected to host device 4. In such an example, hub sleeve 62 may add more ports to host device 4 and may enable host device 4 to have a fully capable dual stack. As such, the functionality of hub device 10 may be split between hub device 10 and hub sleeve 62. Hub device 10 may process all data packets coming from devices 50 and 52 in the secure domain, and hub sleeve 62 may process all data packets coming from devices 54 and 56 in the non-secure domain.

Figure 8:
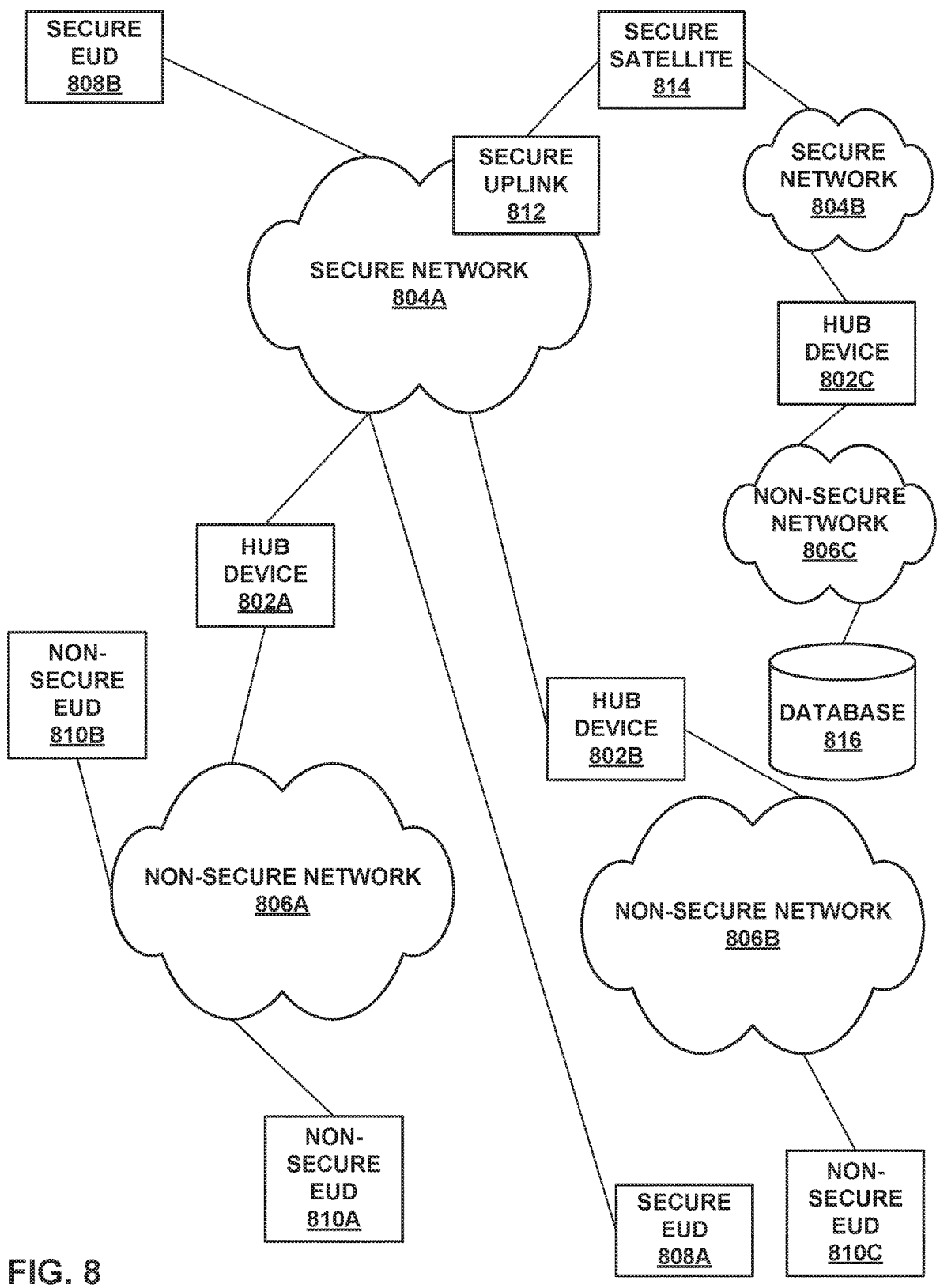
FIG. 8 is a conceptual diagram of a communication system that includes one or more hub devices acting as single cross-domain transfer points between secure and non-secure networks without a direct connection to an end-user device, in accordance with one or more techniques of this disclosure.

FIG. 8 is a conceptual diagram of a communication system that includes one or more hub devices acting as single cross-domain transfer points between secure and non-secure networks without a direct connection to an end-user device, in accordance with one or more techniques of this disclosure. In some examples, such as the example of FIG. 5 where hub 10 is a wearable hub device, the hub device may be worn by the end-users, such as being clipped onto an article of clothing or carried as a backpack. These hub devices may also be mounted onto a vehicle or incorporated to a larger server device. In some instances of such examples, there may not be a singular, dedicated end-user device. Instead, the hub device may act as a gateway between a non-secure network (e.g., a network or connection that has not passed the particular security measures required for the network to be considered "secure" for devices communicating over the network, or networks that have a lesser security requirement than the secure networks) and a secure network. As such, a single hub device may be in communication with multiple secure end-user devices (e.g., radios or smart computing devices) over a secure network, as well as multiple non-secure end-user devices over a non-secure network, analyzing the traffic as it crosses from the non-secure domain to the secure domain, and vice versa, to ensure the safety and integrity of the secure network and to ensure that devices in the non-secure network do not receive classified data.

The example of FIG. 8 shows such a configuration, where hub devices 802A-802C (hereinafter, "hub devices 802") act as gateways between non-secure networks 806A-806C and secure networks 804A and 804B. In this example, hub devices 802 may not be physically connected to any particular end-user device (e.g., non-secure end user devices 810A-810C, database 816, or secure end-user devices 808A-808B), but may be operatively connected these end-user devices through non-secure networks 806A-806C and secure networks 804A and 804B. For instance, each hub device of hub devices 802 may include various secure radios (e.g., a mobile user objective system, a secure soldier radio waveform system, etc.) and non-secure radios (e.g., a WiFi® radio, a non-secure soldier radio waveform system, a long-term evolution telecommunication system, a multiple input multiple output antenna, etc.) to communicate with the end-user devices over the various non-secure networks 806A-806C and secure networks 804A and 804B.

In the example of FIG. 8, various forms of data can be shared from the non-secure side with the secure side. For instance, any of non-secure end-user devices 810A-810C may send video feeds, medical data, or any other type of data that may originate at a non-secure end-user device, as described above. In other instances, given hub devices 802 functionality as a gateway, hub devices 802 may use IP tunneling to forward date received from one of non-secure end-user devices 810A-810C across secure networks 804A and/or 804B to another non-secure end-user device, utilizing the infrastructure already in place to add another form of communication through an area that generally may not be built up to allow such communication. This IP tunneling could be an IPsec tunnel, but could also be clear text but with attached checksums and signatures to be used to detect if changes occurred or if data was added or modified as it traversed the other domain.

Figure 9:
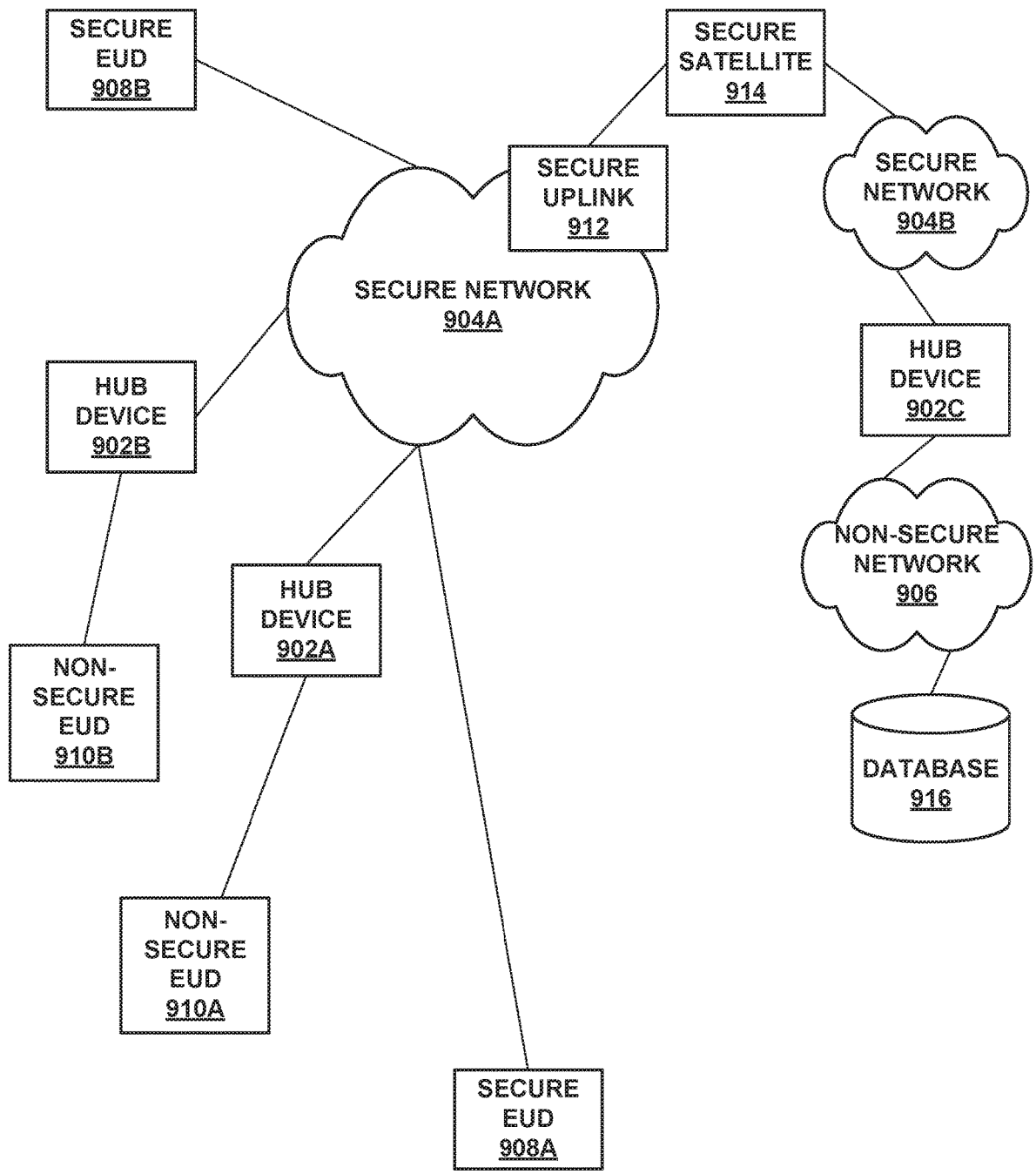
FIG. 9 is a conceptual diagram of a communication system that includes one or more hub devices acting as cross-domain transfer points between a secure network and an end-user device that is not a secure device, in accordance with one or more techniques of this disclosure.

FIG. 9 is a conceptual diagram of a communication system that includes one or more hub devices acting as cross-domain transfer points between a secure network and an end-user device that is not a secure device, in accordance with one or more techniques of this disclosure. In instances where a majority of the data being sent or received is of a lower security classification than the secure network it is traversing or is completely non-secure, the end-user device that is directly connected to the hub device may be in a non-secure domain.

By using a non-secure end-user device directly connected to the hub device, hub devices 902A-902C may utilize non-secure radios to transmit the data rather than only using secure radios to transmit the data across the secure networks 904A-904B. Another benefit of the having non-secure end-user client devices 910A-910B directly connected to the hub devices is the ability to create a High-assurance Tunnel to "tunnel" low-side data over the high-side communications network. Hub devices 902A-902B would work at the front-lines, with hub device 902C in the rear-echelon to provide two end-points to a VPN-like tunnel. As packets enter this tunnel, from either end of the non-secure network, hub devices 902A-902C tag the data packets with a cryptographically signed message hash (i.e., message authentication code) such that message integrity and authenticity can be verified by the receiving end-user device. Before entering secure networks 904A-904B, the data packets may also pass through the cross-domain filters.

Figure 10:
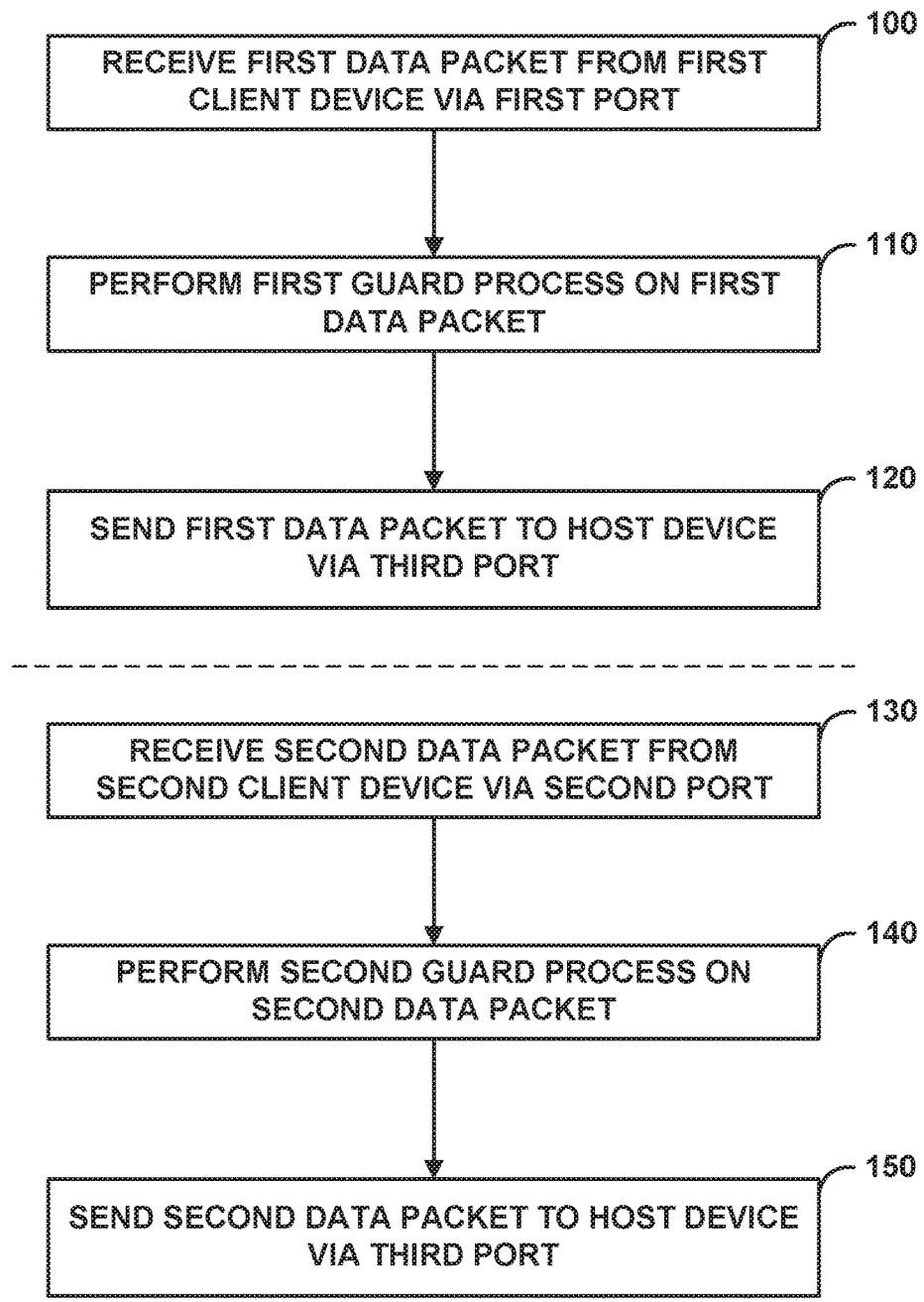
FIG. 10 is a flow diagram illustrating example operations of a hub device that implements data processing techniques in accordance with one or more aspects of this disclosure.

FIG. 10 is a flow diagram illustrating example operations of a hub device that implements data processing techniques in accordance with one or more aspects of this disclosure. The techniques of FIG. 10 may be performed by one or more processors of a computing device, such as hub 10 illustrated in FIG. 1 and/or FIG. 2. For purposes of illustration only, the techniques of FIG. 10 are described within the context of hub 10 of FIG. 1, although computing devices having configurations different than that of hub 10 may perform the techniques of FIG. 10. While the techniques described below with respect to FIG. 10 are described as being performed by processors 14, processors 14 may utilize other modules or applications, such as a virtual machine, to perform all or a portion of the techniques described herein, so as to maintain integrity between the secured data packets and the non-secured data packets.

In accordance with the techniques of this disclosure, processors 14 of hub 10 may receive, via port 12A, a first data packet from non-secure client device 8A (100). Processors 14 of hub 10 may then perform a first guard process on the first data packet (110). Based on results of the first guard process indicating that the first data packet is valid, processors 14 may send the first data packet to host 4 via port 12C (120).

In some examples, based on the sender of the respective data packet, processor 14 may perform separate guard processes on the respective data packet. For instance, processors 14 may execute a separate virtual machine in hub 10, with the virtual machine performing a first guard process on the first data packet based on the security classification of non-secure client device 8A (i.e., non-secure or untrusted) and a second virtual machine performing a second guard process on the second data packet based on the security classification of secure client device 6A (e.g., a secure security classification, such as secret, top secret, classified, or protected).

For the first guard process, processors 14 of hub 10 may utilize the separate virtual machine to determine an integrity of the first data packet based at least in part on a type of connection between hub 10 and non-secure client device 8A and a data type of the first data packet. In other words, the data packet may have a different structure depending on the type of data stored within the data packet and the protocol used to transmit the data packet to hub 10. As such, the specific method for determining the integrity of the first data packet may vary based on the expected structure of the first data packet. If the virtual machine determines that the integrity of the first data packet is above a threshold integrity level, processors 14 may send the first data packet to host 4 via port 12C.

Part of the integrity check may include processors 14 utilizing the separate virtual machine to determine that the actual structure of the first data packet matches an expected structure based on the type of data stored within the data packet and the protocol used to transmit the data packet to hub 10. For instance, if non-secure client device 8A sends an image file over a USB connection, hub 10 may expect the first data packet to have a particular structure with particular bitfields filled out in particular ways. The virtual machine may determine that the first data packet passes the integrity check if the bitfields match the expected structure.

Another part of the integrity check may include processors 14 utilizing the separate virtual machine to perform a virus scan operation on the first data packet. The virus scan operation may include comparing certain values within the data packet to known virus or malware structures. If the virtual machine determines that the first data packet contains a virus or malware, then processors 14 may block the first data packet from reaching host 4. Conversely, if processors 14 determines that the virus scan operation shows no harmful data in the first data packet, processors 14 may forward the first data packet to host 4 via port 12C.

Processors 14 of hub 10 may receive, via port 12B, a second data packet from secure client device 6A (130). Processors 14 of hub 10 may then perform a second guard process on the second data packet (140). Based on results of the second guard process indicating that the second data packet is valid, processors 14 of hub 10 may send, via port 12C, the second data packet to host 4 (150).

For the second guard process, in some instances, processors 14 may simply forward the second data packet to host 4 via port 12C. In other instances, for the second guard process, processors 14 may analyze contents of the second data packet to determine an identity of the sender of the second data packet or the type of contents in the second data packet prior to forwarding the second data packet to host 4 via port 12C. As the second data packet may come from a secure and trusted client device, processors 14 may refrain from determining an integrity of the received data and performing a virus scan operation on the second data packet, instead only verifying that the second client device is a verified secure client device.

Port 12C may forward the respective data packets to host 4 either upon receipt of the respective data packets or after the respective data packets have been processed. In other words, port 12C may not necessarily forward the first data packet and the second data packet simultaneously, but instead forward the first data packet and the second data packet after processors 14 determines the respective data packet to be safe to forward to host 4 in the respective data packet's own respective processing loop. The timing with which processors 14 forward the first data packet is independent of the timing with which processors 14 forward the second data packet.

In some examples, processors 14 may simply forward the first data packet and the second data packet to host 4 upon receiving the respective data packets. In other examples, as described above, processors 14 may implement some form of guard process to evaluate the first data packet received from non-secure client device 8A. Upon determining that the first data packet meets a threshold level of integrity, processors 14 may forward the first data packet to host 4 via port 12C. In still other instances, processors 14 may process certain information regarding the second data packet (i.e., sender information or content information) prior to forwarding the second data packet to host 4.

In some examples, processors 14 of hub 10 may receive an outgoing message to be sent to non-secure client device 8A. For instance, host 4 may attempt to send an ACK message to non-secure client device 8A. Prior to forwarding the ACK message, processors 14 of hub 10 may scan the outgoing message to determine whether the outgoing message contains secure information that would be improper for a non-secure client device to receive. In response to determining that the outgoing message does not contain secure information, processors 14 of hub 10 may send the outgoing message to non-secure client device 8A via port 12A. However, in response to determining that the outgoing message contains secure information, processors 14 of hub 10 may refrain from sending the outgoing message to non-secure client device 8A so as to protect the integrity of the secured system.

In some other examples, rather than expecting host 4 to produce and send ACK messages, processors 14 may utilize a proxy module to produce an ACK message. For instance, if the first data packet was part of a TCP message, processors 14 may utilize the proxy module to create an ACK message and send the ACK message to non-secure client device 8A.

In other examples, processors 14 of hub 10 may prevent all outgoing traffic from reaching non-secure client device 8A. In such examples, processors 14 of hub 10 may receive an outgoing message to be sent to non-secure client device 8A. Upon determining that the intended recipient of the outgoing message is a non-secure client device (i.e., non-secure client device 8A), processors 14 of hub 10 may refrain from sending the outgoing message to non-secure client device 8A so as to protect the integrity of the secured system.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method comprising:
    receiving, by a hub device via a first port, a first data packet from a first client device, wherein the first client device has a first security classification;
    in response to receiving the first data packet from the first client device, sending, by the hub device, an acknowledgement packet to the first client device using a proxy embedded in the hub device;
    performing, by the hub device, a first guard process on the first data packet based at least in part on the first security classification;
    based on results of the first guard process indicating that the first data packet is valid, sending, by the hub device and via a third port, the first data packet to a host device;
    receiving, by the hub device via a second port, a second data packet from a second client device, wherein the second client device has a second security classification different than the first security classification;
    performing, by the hub device, a second guard process on the second data packet based at least in part on the second security classification, wherein the second guard process is different than the first guard process; and
    based on results of the second guard process indicating that the second data packet is valid, sending, by the hub device via the third port, the second data packet to the host device.

2. The method of claim 1, wherein the second guard process comprises verifying that the second client device is a verified secure client device.

3. The method of claim 1, wherein the first guard process comprises:
    performing, by the hub device, an integrity check on the first data packet based at least in part on a type of connection between the hub device and the first client device and a data type of the first data packet, wherein the integrity check comprises:
        determining, by the hub device, an expected structure of the contents of the first data packet based at least in part on the type of connection between the hub device and the first client device and the data type of the first data packet;
        determining, by the hub device, an actual structure of the contents of the first data packet;
        if the actual structure matches the expected structure, determining, by the hub device, that the first data packet passes the integrity check; and
        if the actual structure does not match the expected structure, determining, by the hub device, that the first data packet fails the integrity check.

4. The method of claim 1, wherein the first security classification comprises a non-secure security classification, and wherein the second security classification comprises a secure security classification.

5. The method of claim 4, wherein the secure security classification comprises one or more of secret, top secret, classified, or protected.

6. The method of claim 1, wherein the second guard process comprises refraining, by the hub device, from performing the virus scan operation on the second data packet, wherein the first guard process comprises:
  prior to sending the first data packet to the controller device, performing, by the hub device, a virus scan operation on the first data packet; and
  in response to determining that the virus scan operation shows no harmful data in the first data packet, sending, by the hub device via the third port, the first data packet to the host device.

7. The method of claim 1, further comprising:
  receiving, by the hub device, from the host device, an outgoing message to be sent to the first client device;
  scanning, by the hub device, the outgoing message to determine whether the outgoing message contains secure information;
  in response to determining that the outgoing message does not contain secure information, sending, by the hub device, the outgoing message to the first client device; and
  in response to determining that the outgoing message contains secure information, refraining, by the hub device, from sending the outgoing message to the first client device.

8. The method of claim 1, further comprising:
  receiving, by the hub device, an outgoing message to be sent to the first client device; and
  refraining, by the hub device, from sending the outgoing message to the first client device.

9. The method of claim 1, wherein the first guard process comprises determining, by a virtual machine implemented on the hub device, whether to send the first data packet to the host device.

10. The method of claim 1, wherein the first port is configured to receive the first data packet via a wired connection or a wireless connection.

11. The method of claim 1, wherein the hub device comprises a wearable computing device.

12. The method of claim 1, wherein receiving the first data packet comprises receiving, by the hub device, via the first port on a non-secure network, the first data packet,
  wherein the non-secure network includes only client devices with the first security classification and that communicate over a non-secure connection,
  wherein receiving the second data packet comprises receiving, by the hub device, via the second port on a secure network, the second data packet,
  wherein the secure network includes only client devices with the second security classification and that communicate over a secure connection.

13. The method of claim 1, wherein the host device comprises an end user device with a secure security classification.

14. The method of claim 1, wherein receiving the first data packet comprises receiving, by the hub device, the first data packet via a non-secure network, and
  wherein sending the first data packet to the host device comprises sending, by the hub device, the first data packet to the host device via a secure network.

15. The method of claim 1, wherein the first data packet comprises non-secure data, wherein the second data packet comprises non-secure data, and wherein the host device comprises a non-secure host device.

16. The method of claim 1, wherein the first data packet has a first data type, wherein performing the first guard process is further based on the first data type, and wherein the method further comprises:
  receiving, by the hub device and via the first port, a third data packet from a third client device, wherein the third client device has the first security classification, and wherein the third data packet has a second data type;
  performing, by the hub device, a third guard process on the third data packet based at least in part on the first security classification and the second data type, wherein the third guard process is different than the first guard process; and
  based on results of the third guard process indicating that the third data packet is valid, sending, by the hub device and via a third port, the third data packet to a host device.

17. The method of claim 16, wherein the first data type indicates that the first data packet originated within a first application, and wherein the second data type indicates that the third data packet originated within a second application different from the first application.

18. A device comprising:
  a first port;
  a second port;
  a third port; and
  processing circuitry configured to:
    receive, via the first port, a first data packet from a first client device, wherein the first client device has a first security classification;
    in response to receiving the first data packet from the first client device, send an acknowledgement packet to the first client device using a proxy embedded in the device;
    perform a first guard process on the first data packet based at least in part on the first security classification;
    based on results of the first guard process indicating that the first data packet is valid, send, via the third port, the first data packet to a host device;
    receive, via the second port, a second data packet from a second client device, wherein the second client device has a second security classification different than the first security classification;
    perform a second guard process on the second data packet based at least in part on the second security classification, wherein the second guard process is different than the first guard process; and
    based on results of the second guard process indicating that the second data packet is valid, send, via the third port, the second data packet to the host device.

19. The device of claim 18, wherein the processing circuitry being configured to perform the second guard process comprises the processing circuitry being configured to verify that the second client device is a verified secure client device.

20. The device of claim 18, wherein the processing circuitry being configured to perform the first guard process comprises the processing circuitry being configured to:
  perform an integrity check on the first data packet based at least in part on a type of connection between the hub device and the first client device and a data type of the first data packet, wherein the integrity check comprises:
    determine an expected structure of the contents of the first data packet based at least in part on the type of connection between the hub device and the first client device and the data type of the first data packet;

determine an actual structure of the contents of the first data packet;
if the actual structure matches the expected structure, determine that the first data packet passes the integrity check; and
if the actual structure does not match the expected structure, determine that the first data packet fails the integrity check.

21. The device of claim 18, wherein the processing circuitry being configured to perform the second guard process comprises the processing circuitry being configured to refrain from performing the virus scan operation on the second data packet,
wherein the processing circuitry being configured to perform the first guard process comprises the processing circuitry being configured to:
prior to sending the first data packet to the controller device, perform a virus scan operation on the first data packet; and
in response to determining that the virus scan operation shows no harmful data in the first data packet, send, via the third port, the first data packet to the host device.

22. The device of claim 18, wherein the processing circuitry is further configured to:
receive, from the host device, an outgoing message to be sent to the first client device;
scan the outgoing message to determine whether the outgoing message contains secure information;
in response to determining that the outgoing message does not contain secure information, send the outgoing message to the first client device; and
in response to determining that the outgoing message contains secure information, refrain from sending the outgoing message to the first client device.

23. The device of claim 18, wherein the processing circuitry being configured to receive the first data packet comprises the processing circuitry being configured to receive the first data packet via a non-secure network, and
wherein the processing circuitry being configured to send the first data packet to the host device comprises the processing circuitry being configured to send the first data packet to the host device via a secure network.

24. A non-transitory computer readable storage medium storing instructions that when executed by one or more processors of a computing device cause the one or more processors to:
receive, via a first port, a first data packet from a first client device, wherein the first client device has a first security classification;
in response to receiving the first data packet from the first client device, send an acknowledgement packet to the first client device using a proxy embedded in the computing device;
perform a first guard process on the first data packet based at least in part on the first security classification;
based on results of the first guard process indicating that the first data packet is valid, send, via a third port, the first data packet to a host device;
receive, via a second port, a second data packet from a second client device, wherein the second client device has a second security classification different than the first security classification;
perform a second guard process on the second data packet based at least in part on the second security classification, wherein the second guard process is different than the first guard process; and
based on results of the second guard process indicating that the second data packet is valid, send, via the third port, the second data packet to the host device.

25. The non-transitory computer readable storage medium of claim 24, wherein instructions that cause the one or more processors perform the second guard process comprise instructions that, when executed, cause the one or more processors to verify that the second client device is a verified secure client device.

26. The non-transitory computer readable storage medium of claim 24, wherein instructions that cause the one or more processors perform the first guard process comprise instructions that, when executed, cause the one or more processors to:
perform an integrity check on the first data packet based at least in part on a type of connection between the hub device and the first client device and a data type of the first data packet, wherein the integrity check comprises:
determine an expected structure of the contents of the first data packet based at least in part on the type of connection between the hub device and the first client device and the data type of the first data packet;
determine an actual structure of the contents of the first data packet;
if the actual structure matches the expected structure, determine that the first data packet passes the integrity check; and
if the actual structure does not match the expected structure, determine that the first data packet fails the integrity check.

27. The non-transitory computer readable storage medium of claim 24, wherein the instructions that cause the one or more processors to perform the second guard process comprise instructions that, when executed, cause the one or more processors to refrain from performing the virus scan operation on the second data packet,
wherein instructions that cause the one or more processors perform the first guard process comprise instructions that, when executed, cause the one or more processors to:
prior to sending the first data packet to the controller device, perform a virus scan operation on the first data packet; and
in response to determining that the virus scan operation shows no harmful data in the first data packet, send, via the third port, the first data packet to the host device.

28. The non-transitory computer readable storage medium of claim 24, wherein instructions, when executed, further cause the one or more processors to:
receive, from the host device, an outgoing message to be sent to the first client device;
scan the outgoing message to determine whether the outgoing message contains secure information;
in response to determining that the outgoing message does not contain secure information, send the outgoing message to the first client device; and
in response to determining that the outgoing message contains secure information, refrain from sending the outgoing message to the first client device.

29. The non-transitory computer readable storage medium of claim 24, wherein instructions that cause the one or more processors to receive the first data packet comprise instructions that, when executed, cause the one or more processors to receive the first data packet via a non-secure network, and wherein instructions that cause the one or more processors to send the first data packet to the host device comprise instructions that, when executed, cause the one or more processors to send the first data packet to the host device via a secure network.

\* \* \* \* \*